(12) United States Patent
Tourki et al.

(10) Patent No.: US 11,742,886 B2
(45) Date of Patent: Aug. 29, 2023

(54) DEVICES AND METHODS FOR SINGLE CARRIER MODULATION SCHEMES

(71) Applicant: HUAWEI TECHNOLOGIES CO., LTD., Guangdong (CN)

(72) Inventors: Kamel Tourki, Boulogne Billancourt (FR); Merouane Debbah, Boulogne Billancourt (FR); Rostom Zakaria, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 17/527,874

(22) Filed: Nov. 16, 2021

(65) Prior Publication Data

US 2022/0077884 A1 Mar. 10, 2022

Related U.S. Application Data

(63) Continuation of application No. PCT/EP2019/062621, filed on May 16, 2019.

(51) Int. Cl.
*H04B 1/38* (2015.01)
*H04L 27/26* (2006.01)

(52) U.S. Cl.
CPC .......... *H04B 1/38* (2013.01); *H04L 27/2627* (2013.01); *H04L 27/2649* (2013.01)

(58) Field of Classification Search
CPC ... H04B 1/38; H04L 27/2627; H04L 27/2649; H04L 27/265; H04L 27/2631; H04L 27/263
See application file for complete search history.

(56) References Cited

U.S. PATENT DOCUMENTS 10,218,386 B1 * 2/2019 Langhammer .... H03M 13/1515
2009/0232230 A1 9/2009 Hung et al.

FOREIGN PATENT DOCUMENTS

CN 109471082 A 3/2019

OTHER PUBLICATIONS

Zengdao et al., "Vandermonde-Lagrange Mutually Orthogonal Flexible Transceivers for Blind CDMA in Unknown Multipath", pp. 42-45, May 9-12, 1999 IEEE (Year: 1999).*

(Continued)

*Primary Examiner* — Khanh C Tran
(74) *Attorney, Agent, or Firm* — Fish & Richardson P.C.

(57) ABSTRACT

The present invention relates to single carrier modulation schemes, and presents a transmitter device, a receiver device and a transceiver device for a single carrier modulation scheme. The transmitter device is configured to generate a plurality of signature roots for a single carrier transmission, construct a Lagrange matrix and a Vandermonde matrix based on the plurality of signature roots, and generate a single carrier modulated signal based on the Lagrange and the Vandermonde matrix. The receiver device is configured to determine a plurality of signature roots, construct at least two Vandermonde matrices from the plurality of signature roots, and perform a demodulation of a single carrier modulated signal based on the at least two Vandermonde matrices. The transceiver device comprising a transmitter device configured to generate a single carrier modulated signal, and a receiver device configured to perform a demodulation of the single carrier modulated signal.

20 Claims, 19 Drawing Sheets

(56) References Cited

OTHER PUBLICATIONS

Shengli Zhou, Student Member, Georgios B. Giannakis, Fellow, and Anna Scaglione, "Long Codes for Generalized FH-PFDMA Through Unknown Multi Path Channels", IEEE Transactions on Communications, vol. 49, No. 4, Apr. 2001. (Year: 2001).*
Asplund et al., "How typical is the 'typical urban' channel model?" IEEE Vehicular Technology Conference—VTC Spring 2008, May 2008, 4 pages.
Bernadó et al., "Delay and Doppler Spreads of Nonstationary Vehicular Channels for Safety-Relevant Scenarios," IEEE Transactions on Vehicular Technology, vol. 63, No. 1, Jan. 2014, 12 pages.
Calvetti et al., "Fast inversion of Vandermonde-like matrices involving orthogonal polynomials," BIT Numerical Mathematics, vol. 33, No. 3, Sep. 1993, 4 pages.
Giannakis et al., "AMOUR—Generalized Multicarrier Transceivers for Blind CDMA Regardless of Multipath," IEEE Transactions on Communications, vol. 48, No. 12, Dec. 2000, 13 pages.
Giannakis et al., "Mutually Orthogonal Transceivers for Blind Uplink CDMA Irrespective of Multipath Channel Nulls," 1999 IEEE International Conference on Acoustics, Speech, and Signal Processing (ICASSP99), Mar. 1999, 12 pages.
Lin et al., "Perfect Discrete Multitone Modulation with Optimal Transceivers," IEEE Transactions on Signal Processing, vol. 48, No. 6, Jun. 2000, 10 pages.
Liu et al., "Space-Time Block-Coded Multiple Access Through Frequency-Selective Fading Channels," IEEE Transactions on Communications, vol. 49, No. 6, Jun. 2001, 12 pages.
Mitra, "Digital Signal Processing: A Computer-based Approach," Second Edition, Ed. McGraw-Hill, Jul. 2001, 879 pages.
Nissel et al., "Filter Bank Multicarrier Modulation Schemes for Future Mobile Communications," IEEE Journal on Selected Areas in Communications, vol. 35, No. 8, Aug. 2017, 15 pages.
PCT International Search Report and Written Opinion issued in International Application No. PCT/EP2019/062621 dated Feb. 10, 2020, 11 pages.
Scaglione et al., "Design of user codes in QS-CDMA systems for MUI elimination in unknown multipath," IEEE Communications Letters, vol. 3, No. 2, Feb. 1999, 3 pages.
Scaglione et al., "Lagrange/Vandermonde MUI eliminating User Codes for Quasi-Synchronous CDMA in Unknown Multipath," IEEE Transactions on Signal Processing, vol. 48, No. 7, Jul. 2000, 17 pages.
Scaglione et al., "Redundant Filterbank Precoders and Equalizers Part I: Unification and Optimal Designs," IEEE Transactions on Signal Processing, vol. 47, No. 7, Jul. 1999, 19 pages.
Scaglione et al., "Redundant Filterbank Precoders and Equalizers Part II: Blind Channel Estimation, Synchronization, and Direct Equalization," IEEE Transactions on Signal Processing, vol. 47, No. 7, Jul. 1999, 16 pages.
Schwarz et al., "Signal Processing Challenges in Cellular-Assisted Vehicular Communications: Efforts and Developments within 3GPP LTE and Beyond," IEEE Signal Processing Magazine, vol. 34, No. 2, Mar. 2017, 13 pages.
Skrzipek, "Inversion of Vandermonde-Like Matrices," BIT Numerical Mathematics, vol. 44, Issue 2, May 2004, 16 pages.
Vaidyanathan et al., "Discrete Multitone Modulation with Principal Component Filter Banks," IEEE Transactions on Circuits and Systems I: Fundamental Theory and Applications, vol. 49, No. 10, Oct. 2002, 16 pages.
Wang et al., "Block Precoding for MUI/ISI Resilient Generalized Multicarrier CDMA With Multirate Capabilities," IEEE Transactions on Communications, vol. 49, No. 11, Nov. 2001, 12 pages.
Zhou et al., "Space-Time Coding With Maximum Diversity Gains Over Frequency-Selective Fading Channels," IEEE Signal Processing Letters, vol. 8, No. 10, Oct. 2001, 4 pages.
Zhou et al., "Long Codes for Generalized FH-OFDMA Through Unknown Multipath Channels," IEEE Transactions on Communications, vol. 49, No. 4, Apr. 2001, 13 pages.
Office Action issued in Chinese Application No. 201980094080.2 dated Apr. 6, 2022, 14 pages (with English translation).

* cited by examiner

DEVICES AND METHODS FOR SINGLE CARRIER MODULATION SCHEMES

CROSS-REFERENCE TO RELATED APPLICATIONS

This application is a continuation of International Application No. PCT/EP2019/062621, filed on May 16, 2019, the disclosure of which is hereby incorporated by reference in its entirety.

TECHNICAL FIELD

The present disclosure relates generally to the field of single carrier systems, and particularly to a transmitter device, a receiver device, a transceiver device and implemented methods thereof.

The present disclosure specifically presents a transceiver device, which provides a new waveform design based on a Lagrange-Vandermonde (LV) single carrier modulation scheme, which may allow for single-tap equalization with a low complex transceiver design. The present invention also presents a transmitter device, in particular for a single carrier modulation scheme such as the LV single carrier modulation scheme. The disclosure also presents a receiver device, in particular for a single carrier modulation scheme such as the LV single carrier modulation scheme.

BACKGROUND

The 3rd Generation Partnership Project (3GPP) agreed to use the Orthogonal Frequency Division Multiplexing (OFDM) (e.g., with some small modifications) for the Fifth Generation (5G) mobile communications. Although, such decision may be useful in terms of backwards compatibility to the Fourth Generation (4G) wireless systems, it is not the most efficient technique for all possible use cases. Moreover, the OFDM may be used as the modulation format (or the waveform) in the both downlink (DL) and uplink (UL) transmissions. Furthermore, while the OFDM use is well-known for DL transmissions, it is new for the UL transmissions in the mobile communication networks. In addition, having the same waveform in both UL and DL transmissions may enable an easier communication for the device-to-device communication in future releases. It is worth mentioning that UL communication will suffer from high peak-to-average power ratio (PAPR) when using multicarrier transmitter (Tx). For this reason, 4G systems optimized for Single Carrier Frequency Division Multiplexing Access (SC-FDMA), where single carrier transmission is enabled in the UL. FIG. 18 schematically illustrates a Single Carrier Frequency Division Multiplexing Access block diagram 1800.

FIG. 18 shows how the 4G transmitter switches from a multicarrier to a single carrier transmission by adding the "block" 1801 that made the signal introduced in time domain instead of frequency domain through a Fast Fourier transform (FFT). A reverse operation is made at the receiver (Rx) by adding the "block" 1802. Moreover, going back to 5G and beyond, the future mobile systems may be highly heterogeneous and characterized by a large range of possible use cases, ranging from enhanced Mobile BroadBand (eMBB) over enhanced Machine Type Communications (eMTC) to Ultra-Reliable Low latency Communications (URLLC) in vehicular communications. A more flexible waveform design, e.g., being able to switch from a single carrier to multicarrier and vice-versa, is of great significance to handle all the aforementioned use cases.

Moreover, the frequency domain received signal (before going through the IFFT box 1802 in FIG. 18) is given by Eq. 1:

$$y = \begin{bmatrix} H_0 & & \\ & \ddots & \\ & & H_{K-1} \end{bmatrix} s + F\tilde{n} \qquad \text{Eq. 1}$$

where $$H_k = H(2\pi k/K) = \sum_{l=0}^{L} h_l e^{-j2\pi kl/K}$$

is the frequency response channel at the $k^{th}$ subcarrier, and F is a Discrete Fourier Transform (DFT) K×K matrix given by Eq. 2:

$$F = F_{K \times K} = \frac{1}{K} \begin{bmatrix} 1 & 1 & \cdots & 1 \\ 1 & w & \cdots & w^{K-1} \\ \vdots & \vdots & & \vdots \\ 1 & w^{K-1} & \cdots & w^{(K-1)(K-1)} \end{bmatrix}, w = \exp\left(-j\frac{2\pi}{K}\right) \qquad \text{Eq. 2}$$

However, it has the obvious drawback that the symbol $S_k(n)$ transmitted on the $k^{th}$ subcarrier cannot be recovered when it is hit by a channel zero ($H_k=0$). In this case, the Perfect Recovery (PR) condition has not been satisfied.

Generally, a Lagrange-Vandermonde scheme has also been proposed for Code-Division Multiple Access (CDMA) systems. FIG. 19 schematically illustrates a conventional scheme based on a Mutually-Orthogonal Usercode-Receiver (AMOUR) block diagram 1900. The AMOUR system is the most generalized framework for quasi-synchronous blind CDMA which has been proposed.

In the AMOUR system 1900, following operations may be performed:
1. Every user transmitting K symbols may use K spreading codes of length P, where P=M(L+K)+L, where M is the number of users, and where L is the channel delay spread.
2. The $k^{th}$ symbol of the $\mu^{th}$ user may use the spreading code (e.g., it may be derived from Lagrange polynomials, for example, based on Eq. 3):

$$C_{\mu,k}(z) = \sum_{\lambda=0}^{J-L} \theta_\mu(\lambda, k) \prod_{\substack{m=0 \\ (m,j) \neq (\mu,\lambda)}}^{M-1} \prod_{j=0}^{J-1} \frac{1 - \rho_{m,j} z^{-1}}{1 - \rho_{m,j} \rho_{\mu,\lambda}^{-1}}. \qquad \text{Eq. 3}$$

3. The J=K+L receive filters of the $m^{th}$ user may form a Vandermonde matrix, for example, based on Eq. 4:

$$G_m = [v_P(\beta_{m,0}) \ldots v_P(\mu_{m,J-1})]^T \qquad \text{Eq. 4}$$

where $v_P(\rho)$ may be obtained from Eq. 5:

$$v_P(\rho) = [1, \rho^{-1}, \ldots \rho^{-(P-1)}]^T \qquad \text{Eq. 5}$$

However, the conventional devices and methods have the following disadvantages:

1. The Perfect Recovery (PR) condition may not always be satisfied. Moreover, a single tap equalization cannot be used, and a more complex receiver is required. For example, if the $\Gamma_m^{(zf)} = \tilde{H}_m^{-1}$, where $\tilde{H}_m$ may be obtained according to Eq. 6:

$$\tilde{H}_m := \begin{bmatrix} h_m(i;0) & \cdots & 0 & \cdots & 0 \\ \vdots & \ddots & \vdots & & \vdots \\ h_m(i;K-1) & & h_m(i;0) & & 0 \\ \vdots & \ddots & \vdots & \ddots & \vdots \\ 0 & \cdots & h_m(i;K-1) & \cdots & h_m(i;0) \end{bmatrix} \quad \text{Eq. 6}$$

2. The transmitter (Tx) is required to communicate the signature roots ($\rho$) to the receiver (Rx) (e.g., in order to build the G and the $V_m$).

In this case, the channel state information should be available at the Tx (CSIT), in order to select the signature roots that should be communicated to the Rx.

3. Currently, there is no proposals for optimal signature roots selection (Lack of a method for modifying (e.g., adjusting, optimizing) the signature roots selection).

For instance, the signature roots of all users may be selected over the unit circles, where the $k^{th}$ signature root of the $m^{th}$ user is given by $$\rho_{m,k} = e^{j\frac{2\pi(m+kM)}{M(L+K)}}, m \in [0, M-1]. \quad \text{Eq. 7}$$

4. High implementation complexity

For example, conventionally, the Rx needs to invert the $V_m$ while the inversion of a Vandermonde matrix is complex and costs $O(J^3)$ amount of operations, where $J=K+L$. Moreover, conventionally, signature roots are also used that are spread over the unit circle where $V_m^{-1}$ reduces to a Discrete Fourier Transform (DFT) matrix (see disadvantage mentioned under point 3).

5. Unbalanced hardware implementation:

For example, the J Rx filters may be needed while only the K Tx codes have been used. This redundancy is at the cost of the bandwidth efficiency.

6. The proposed scheme where the $m^{th}$ Tx uses spreading $C_{m,k}$ (given above) for the $k^{th}$ symbol cannot be used for a multicarrier system, since the expression for every user m reduces to a single carrier transmission while the signature roots spread over a unit circle (i.e., it cannot be seen as an OFDM scheme).

Although there exist techniques for providing a single modulation scheme (e.g., the conventional SC-FDMA scheme), it is generally desirable to provide improved devices and methods, e.g. for providing a single carrier modulation scheme.

SUMMARY

In view of the above-mentioned problems and disadvantages, embodiments of the invention aim to improve the conventional devices and methods. An objective is thereby to provide devices and methods for providing a new single carrier modulation scheme.

The objective of the present invention is achieved by embodiments as provided in the enclosed independent claims. Advantageous implementations of the embodiments are further defined in the dependent claims.

In particular embodiments of the invention propose devices and methods based on a single carrier modulation schemes referred to as Lagrange-Vandermonde modulation that may generalize the conventional SC-FDMA scheme, while satisfying the PR condition.

The main advantages of the embodiments of the invention can be summarized as follows:

Providing a Lagrange-Vandermonde single carrier modulation scheme, which may satisfy the perfect recovery conditions.

Providing devices and methods for a single user transceiver.

Keeping the transceiver implementation with the least complexity and balanced implementation (for example, same as OFDM).

The present invention generalizes the conventional SC-FDMA scheme.

The performance of the present invention (devices and methods of the present invention) may outperform the performance of the conventional SC-FDMA scheme.

A first aspect of the invention provides a transmitter device for a single carrier modulation scheme, the transmitter device being configured to generate a plurality of signature roots for a single carrier transmission, wherein each signature root is a nonzero complex point; construct a Lagrange matrix and a Vandermonde matrix based on the plurality of signature roots; and generate a single carrier modulated signal based on the Lagrange matrix and the Vandermonde matrix.

The transmitter device of the first aspect may provide, for example, a precoder or a modulation scheme with (perfect) inter-symbol interference cancellation.

In some embodiments, the transmitter device may generate the plurality of signature roots, for example, the transmitter device may generate the plurality of signature roots that are uniformly distributed on the circumference of a circle.

In an implementation form of the first aspect, the transmitter device is further configured to perform a zero-padding procedure or a cyclic-prefix procedure on the single carrier modulated signal.

A second aspect of the invention provides a receiver device for a single carrier modulation scheme, the receiver device being configured to determine a plurality of signature roots, wherein each signature root is a nonzero complex point; construct at least two Vandermonde matrices from the plurality of signature roots; and perform a demodulation of a single carrier modulated signal based on the at least two Vandermonde matrices.

In some embodiments, the receiver device may determine the plurality of signature roots which are uniformly distributed on the circumference of a circle. The circle may have the radius of "a".

The receiver device of the second aspect may satisfy a Perfect Recovery (PR) condition. For example, in some embodiments, the transmitter device may use the precoder or the modulation scheme with perfect ISI cancellation. Moreover, a linear receiver device with single tap equalization may be provided which may satisfy the perfect recovery condition.

In an implementation form of the second aspect, the demodulation comprises performing a pre-equalization procedure based on one of the Vandermonde matrices; applying a one-tap equalizer on the output of the pre-equalization procedure; and performing a post equalization procedure on the output of the one-tap equalizer, based on the other Vandermonde matrix.

In a further implementation form of the second aspect, the receiver device is further configured to determine a radius of a circle based on channel state information of a communication channel, wherein the determined plurality of signature roots are uniformly distributed on the circumference of the circle.

For example, the plurality of signature roots ($\rho_k$) may be uniformly distributed on the circumference of the circle, e.g., uniformly spread over a circle of radius a, such that $$\rho_k = ae^{\frac{j2\pi k}{K}}.$$

Moreover, the receiver device may determine the radius of the circle.

Moreover, every user has its own channel environment for which the signature roots may further be modified (e.g., optimized). In addition, the K signature roots of every user m may be modified (e.g., optimized) according to a certain metric.

In a further implementation form of the second aspect, the receiver device is further configured to compute a metric for evaluating the radius of the circle and/or the plurality of signature roots, based on channel state information of a communication channel.

For example, in some embodiments, the receiver device may further modify the radius "a" through an optimization block using a metric (such as the Mean Squared Error (MSE)) and may further obtain $a_{opt}$. The $a_{opt}$ is the radius "a" which may be modified, optimized, etc.

Moreover, in some embodiments, the receiver device may include a $\rho$ refinement algorithm or a $\rho$ refinement unit which may be configured to modify (e.g., refine, optimize) the plurality of signature roots. In particular, the $\rho$ refinement algorithm may be based on the machine learning algorithm such as the gradient descent algorithm.

In a further implementation form of the second aspect, the receiver device is further configured to modify individually each signature root from the plurality of signature roots based on a machine learning algorithm, in particular a gradient descent algorithm.

For example, in some embodiments, the receiver device may modify the plurality of the signature roots. Furthermore, the receiver device may determine at least one vector for the plurality of signature roots which may indicate the modified signature roots. The vector may be a vector of the complex points.

In a further implementation form of the second aspect, the receiver device is further configured to perform the demodulation of the single carrier modulated signal, considering the individual modification of each signature root.

A third aspect of the invention provides a transceiver device a transmitter device according to the first aspect or one of the implementation form of the first aspect and a receiver device according to the second aspect or one of the implementation form of the second aspect.

The transceiver device of the third aspect may comprise the transmitter device (according to the first aspect or one of the implementation form of the first aspect) which may provide the precoder or the modulation scheme with perfect ISI cancellation. Moreover, the transceiver device of the third aspect may further comprise the receiver device (according to second aspect or one of the implementation form of the second aspect) which may be based on a linear reduced-complexity receivers with single tap equalization that satisfies the perfect recovery condition.

A fourth aspect of the invention provides a transceiver device for a single carrier modulation scheme, the transceiver device comprising a transmitter device configured to generate a single carrier modulated signal based on constructing a Lagrange matrix and a Vandermonde matrix; and a receiver device configured to perform a demodulation of the single carrier modulated signal based on constructing at least two Vandermonde matrices.

In particular, the transceiver device of the fourth aspect may be based on (e.g., it may provide) a single carrier modulation scheme referred to as Lagrange-Vandermonde single carrier modulation scheme that may generalize the conventional SC-FDMA modulation scheme.

A fifth aspect of the invention provides a method for being implemented at a transmitter device, the method comprising generating a plurality of signature roots for a single carrier transmission, wherein each signature root is a nonzero complex point; constructing a Lagrange matrix and a Vandermonde matrix based on the plurality of signature roots; and generating a single carrier modulated signal based on the constructed Lagrange matrix and the Vandermonde matrix.

In an implementation form of the fifth aspect, the method further comprises performing a zero-padding procedure or a cyclic-prefix procedure on the single carrier modulated signal.

A sixth aspect of the invention provides a method for being implemented at a receiver device, the method comprising determining a plurality of signature roots, wherein each signature root is a nonzero complex point; constructing at least two Vandermonde matrices from the plurality of signature roots; and performing a demodulation of a single carrier modulated signal based on the at least two Vandermonde matrices.

In an implementation form of the sixth aspect, the method further comprises performing a pre-equalization procedure based on one of the Vandermonde matrices; applying a one-tap equalizer on the output of the pre-equalization procedure; and performing a post equalization procedure on the output of the one-tap equalizer, based on the other Vandermonde matrix.

In a further implementation form of the sixth aspect, the method further comprises determining a radius of a circle based on channel state information of a communication channel, wherein the determined plurality of signature roots are uniformly distributed on the circumference of the circle.

In a further implementation form of the sixth aspect, the method further comprises computing a metric for evaluating the radius of the circle and/or the plurality of signature roots, based on channel state information of a communication channel.

In a further implementation form of the sixth aspect, the method further comprises modifying individually each signature root from the plurality of signature roots based on a machine learning algorithm, in particular a gradient descent algorithm.

In a further implementation form of the sixth aspect, the method further comprises performing the demodulation of the single carrier modulated signal, considering the individual modification of each signature root.

A seventh aspect of the invention provides a method for being implemented at a transceiver device, the method comprising generating, at a transmitter device, a single carrier modulated signal based on a Lagrange matrix and a Vandermonde matrix; and performing, at a receiver device, a demodulation of the single carrier modulated signal based on at least two Vandermonde matrices.

In an implementation form of the seventh aspect, the method further comprises performing, at a transmitter device, a zero-padding procedure or a cyclic-prefix procedure on the single carrier modulated signal.

In a further implementation form of the seventh aspect, the method further comprises performing, at a receiver device, a pre-equalization procedure based on one of the Vandermonde matrices; applying, at a receiver device, a one-tap equalizer on the output of the pre-equalization procedure; and performing, at a receiver device, a post equalization procedure on the output of the one-tap equalizer, based on the other Vandermonde matrix.

In a further implementation form of the seventh aspect, the method further comprises determining, at a receiver device, a radius of a circle based on channel state information of a communication channel, wherein the determined plurality of signature roots are uniformly distributed on the circumference of the circle.

In a further implementation form of the seventh aspect, the method further comprises computing, at a receiver device, a metric for evaluating the radius of the circle and/or the plurality of signature roots, based on channel state information of a communication channel.

In a further implementation form of the seventh aspect, the method further comprises modifying, at a receiver device, individually each signature root from the plurality of signature roots based on a machine learning algorithm, in particular a gradient descent algorithm.

In a further implementation form of the seventh aspect, the method further comprises performing, at a receiver device, the demodulation of the single carrier modulated signal, considering the individual modification of each signature root.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
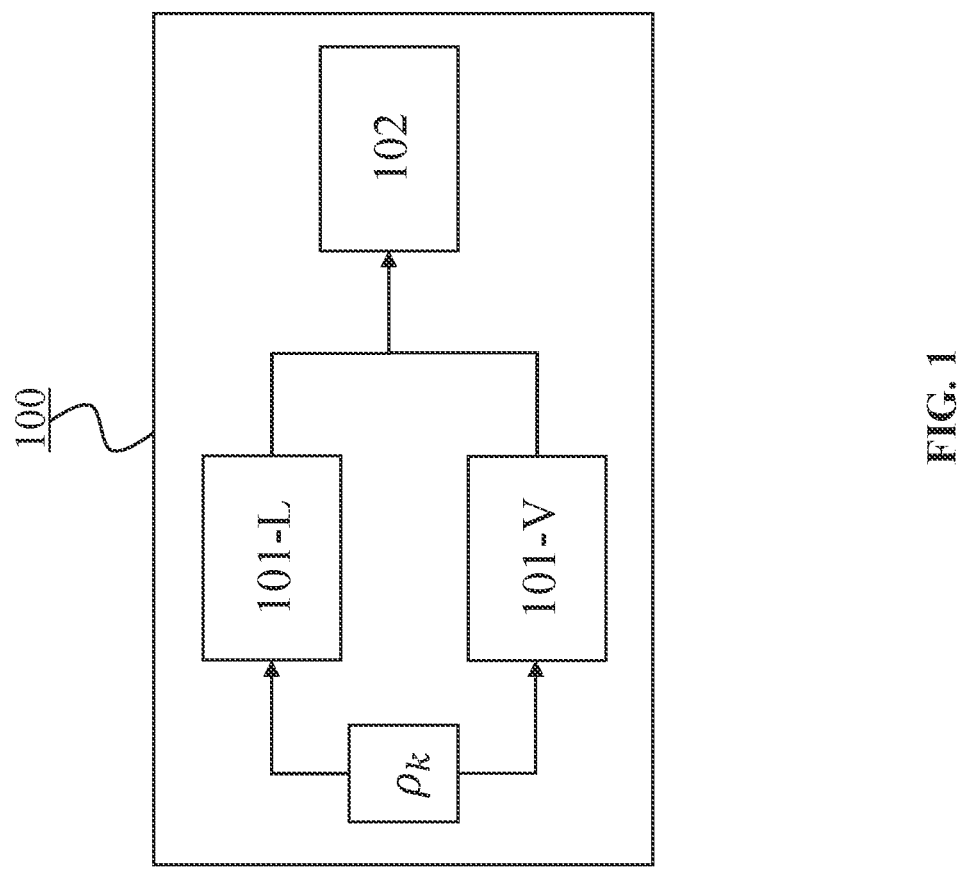
FIG. 1 is a schematic view of a transmitter device for a single carrier modulation scheme, according to an embodiment of the present invention.

FIG. 1 is a schematic view of a transmitter device 100 for a single carrier modulation scheme, according to an embodiment of the present invention.

The transmitter device 100 for the single carrier modulation scheme is configured generate a plurality of signature roots $\rho_k$ for a single carrier transmission, wherein each signature root $\rho_k$ is a nonzero complex point.

The transmitter device 100 is further configured to construct a Lagrange matrix 101-L and a Vandermonde matrix 101-V based on the plurality of signature roots $\rho_k$.

The transmitter device 100 is further configured to generate a single carrier modulated signal 102 based on the Lagrange matrix 101-L and the Vandermonde matrix 101-V.

The transmitter device 100 may comprise processing circuitry (not shown) configured to perform, conduct or initiate the various operations of the transmitter device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the transmitter device 100 to perform, conduct or initiate the operations or methods described herein.

Moreover, in some embodiments, the transmitter device 100 may further be incorporated in a transceiver device.

Figure 2:
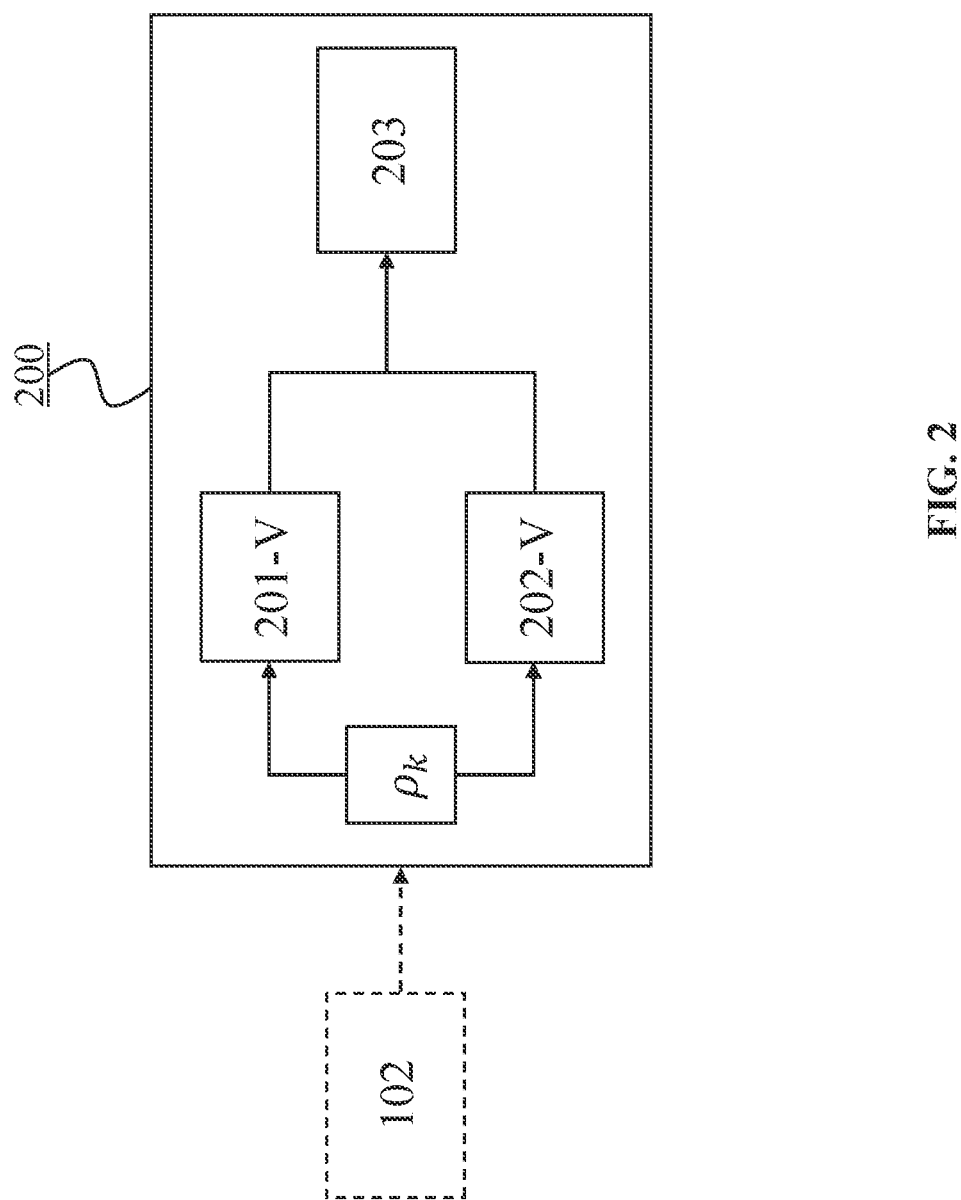
FIG. 2 is a schematic view of a receiver device for a single carrier modulation scheme, according to an embodiment of the present invention.

FIG. 2 is a schematic view of a receiver device 200 for a single carrier modulation scheme, according to an embodiment of the present invention.

The receiver device 200 for the single carrier modulation scheme is configured to determine a plurality of signature roots $\rho_k$, wherein each signature root is a nonzero complex point.

The receiver device 200 is further configured to construct at least two Vandermonde matrices 201-V, 202-V from the plurality of signature roots $\rho_k$.

The receiver device 200 is further configured to perform a demodulation 203 of a single carrier modulated signal 102 based on the at least two Vandermonde matrices 201-V, 202-V.

The receiver device 200 may comprise processing circuitry (not shown) configured to perform, conduct or initiate the various operations of the receiver device 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the receiver device 200 to perform, conduct or initiate the operations or methods described herein.

Moreover, in some embodiments, the receiver device 200 may further be incorporated in a transceiver device.

Figure 3:
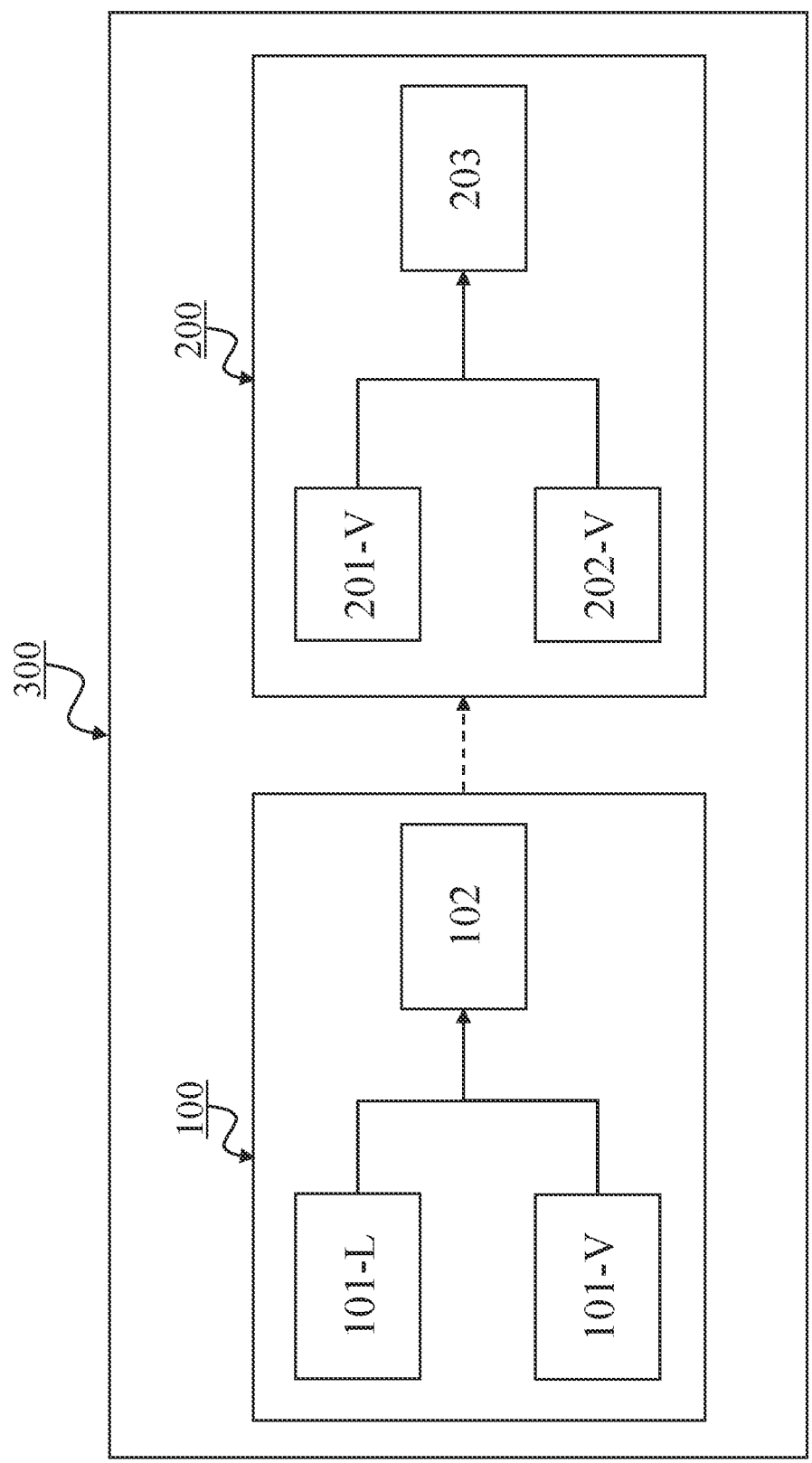
FIG. 3 is a schematic view of a transceiver device for a single carrier modulation scheme, according to an embodiment of the present invention.

FIG. 3 is a schematic view of a transceiver device 300 for a single carrier modulation scheme, according to an embodiment of the present invention.

The transceiver device 300 comprises a transmitter device 100 configured to configured to generate a single carrier modulated signal 102 based on constructing a Lagrange matrix 101-L and a Vandermonde matrix 101-V.

The transceiver device 300 further comprises a receiver device 200 configured to perform a demodulation 203 of the single carrier modulated signal 102 based on constructing at least two Vandermonde matrices 201-V, 202-V.

For example, the transceiver device 300 may be based on a LV single carrier modulation scheme. For instance, the transmitter device 100 of the transceiver device 300 may generate the single carrier modulated signal 102 based on constructing a Lagrange matrix 101-L and a Vandermonde matrix 101-V. Moreover, the receiver device 200 may obtain the single carrier modulated signal 102 and may further construct the two Vandermonde matrix 201-V, 202-V from the plurality of signature roots $\rho_k$. Furthermore, the receiver device 200 may perform the demodulation 203 of the single carrier modulated signal 102 based on the two Vandermonde matrix 201-V, 202-V.

The transceiver device 300 may comprise processing circuitry (not shown) configured to perform, conduct or initiate the various operations of the transceiver device 300 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the transceiver device 300 to perform, conduct or initiate the operations or methods described herein.

Figure 4:
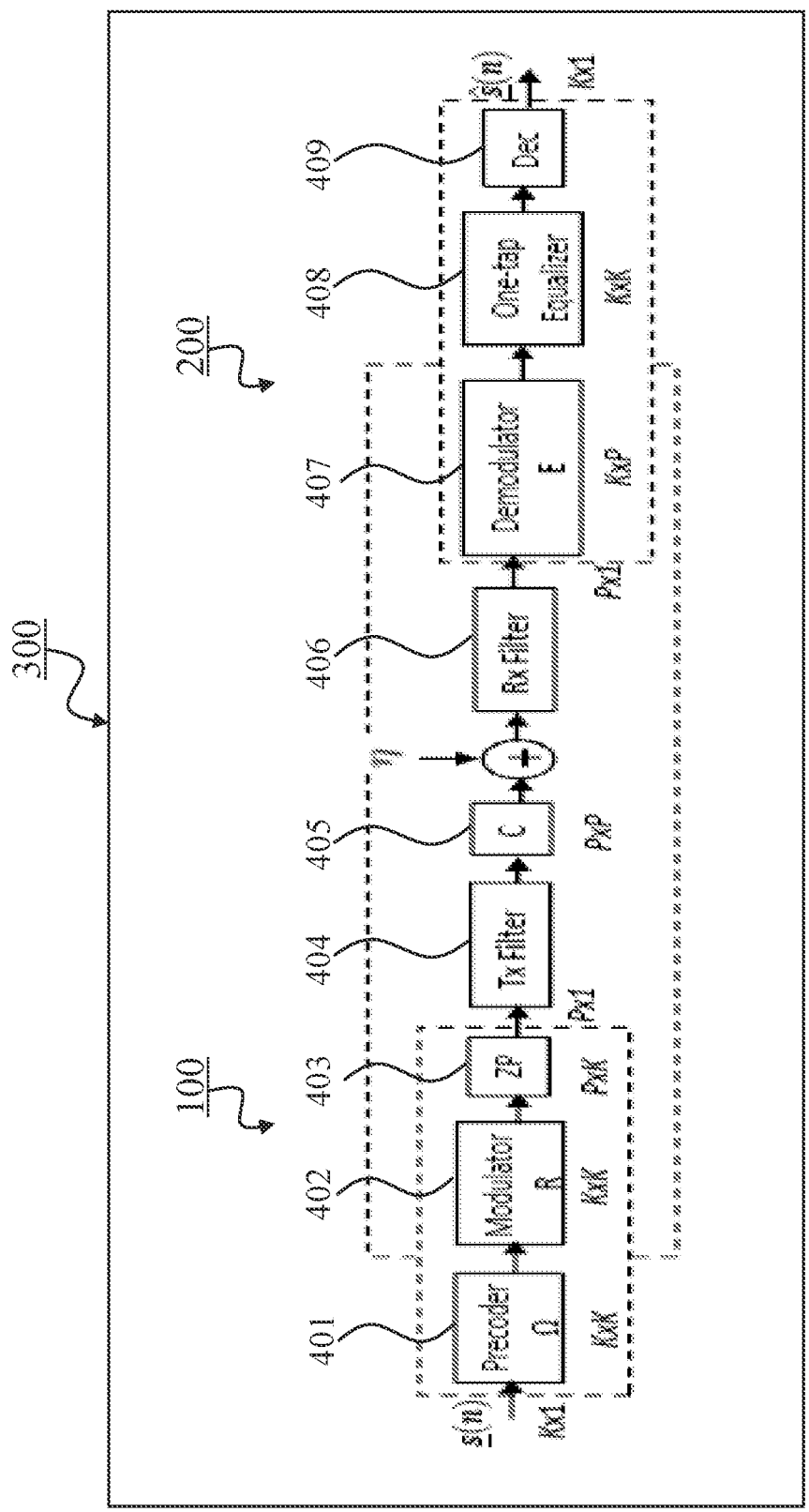
FIG. 4 is an exemplarily scheme of a transceiver device comprising a transmitter device using a Lagrange matrix for modulation and a receiver device using a Vandermonde matrix for demodulation, according to an embodiment of the invention.

Reference is made to FIG. 4 which is an exemplarily scheme of a transceiver device 300 comprising the transmitter device 100 using a Lagrange matrix for modulation and a receiver device 200 using a Vandermonde matrix for demodulation, according to an embodiment of the invention.

Moreover, it may be determined, whether it is possible to:
1. design a transmitter device being compatible with the multicarrier LV transmitter with perfect inter-symbol interference (ISI) cancellation using a low complexity receiver device implementation (i.e., linear receiver with single tap equalization) while;
2. satisfying the perfect recovery condition.

In the following, some mathematical basics and notation are briefly discussed, that may be used by the transmitter device 100 and/or the receiver device 200 and/or the transceiver device 300, without limiting the present invention.

For example, from a set of K distinct nonzero complex points $\{\rho_k\}_{k=1}^{K}$, that are referred to as signature roots, a Vandermonde matrix may be constructed. The Vandermonde matrix, is a K×P matrix, given by Eq. 8:

$$V_{K \times P} = \begin{bmatrix} 1 & \rho_0^{-1} & \cdots & \rho_0^{1-P} \\ 1 & \rho_1^{-1} & \cdots & \rho_1^{1-P} \\ \vdots & \vdots & & \vdots \\ 1 & \rho_{K-1}^{-1} & \cdots & \rho_{K-1}^{1-P} \end{bmatrix}, v_{k,p} = (\rho_{k-1}^{1-p}) \quad \text{Eq. 8}$$

Moreover, note that, if $$\rho_k = \frac{1}{\sqrt{K}} \exp\left(j\frac{2\pi k}{K}\right) = \frac{1}{\sqrt{K}} w^{-k},$$

therefore, $V_{K \times K} = F_{K \times K}$ which is the Discrete Fourier Transform (DFT) matrix given above.

Furthermore, taking Tx filters as linear combinations of the Lagrange polynomials, Eq. 9 may be obtained as follow:

$$F_k(z) = \sum_{n=0}^{K-1} \beta_n \prod_{\substack{q=0 \\ q \neq n}}^{K-1} \frac{\rho_q z^{-1} - 1}{\rho_q \rho_n^{-1} - 1} \qquad \text{Eq. 9}$$

If $\beta_n$ are set to $\beta_n = \rho_n^{-k}$, it turns out that, $$F_k(z) = \sum_{n=0}^{K-1} \rho_n^{-k} \prod_{\substack{q=0 \\ q \neq n}}^{K-1} \frac{\rho_q z^{-1} - 1}{\rho_q \rho_n^{-1} - 1} = z^{-k} \qquad \text{Eq. 10}$$

Therefore, the synthesis filter bank reduces to a parallel-to-serial convertor and a single carrier transmission may be obtained.

Figure 5:
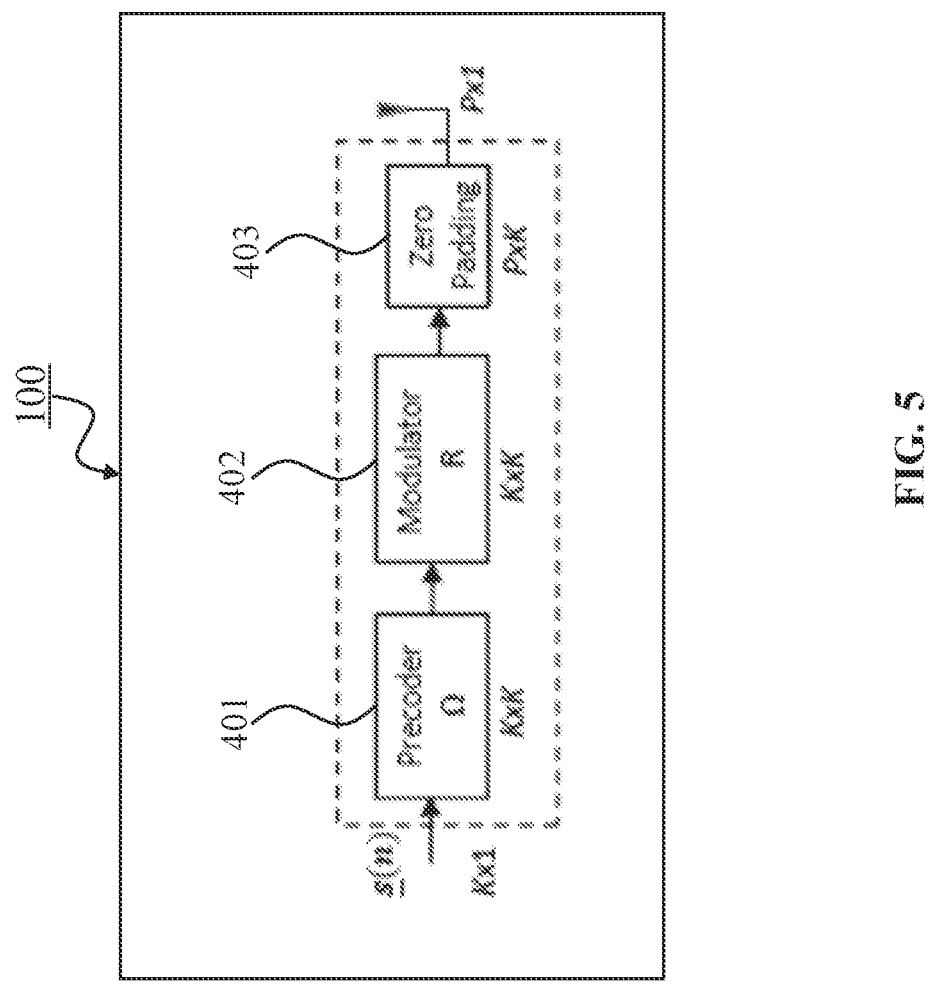
FIG. 5 is another exemplarily scheme of the transmitter device for the single carrier modulation scheme, according to an embodiment of the invention.

Reference is made to FIG. 5 which is another exemplarily scheme of the transmitter device 100 for the single carrier modulation scheme, according to an embodiment of the invention.

In the single carrier transmitter device block diagram of the FIG. 5, the transmitter device 100 includes a precoder 401, a modulator 402 and a Zero Padding block 403.

Moreover, the single carrier transmitter device may be compatible with the multicarrier LV transmitter.

The transmitter device 100 (for example, it may be the transmitter device of the multicarrier LV scheme of FIG. 4) may include the precoder 401 and the modulator 402 which may be given by R and $\Omega$, respectively, as follow:

$$R = \begin{bmatrix} 1 & \rho_0^{-1} & \cdots & \rho_0^{1-K} \\ 1 & \rho_1^{-1} & \cdots & \rho_1^{1-K} \\ \vdots & \vdots & & \vdots \\ 1 & \rho_{K-1}^{-1} & \cdots & \rho_{K-1}^{1-K} \end{bmatrix} \qquad \text{Eq. 11}$$

and, $$\Omega = \frac{1}{K} \begin{bmatrix} 1 & \rho_0 & \cdots & \rho_0^{K-1} \\ 1 & \rho_1 & \cdots & \rho_1^{K-1} \\ \vdots & \vdots & & \vdots \\ 1 & \rho_{K-1} & \cdots & \rho_{K-1}^{K-1} \end{bmatrix}^T \qquad \text{Eq. 12}$$

Moreover, it may be verified that $R\Omega = I \forall \rho_k$.

Note that, the transmission process turns out to add L zeros (in case of LV Tx) or a cyclic prefix of L (in case of VL Tx) to the K symbols, and may further transmit using a single carrier.

Furthermore, a single carrier transmitter device may be obtained which may be compatible with the multicarrier VL by using other Vandermonde matrices, and adding a cyclic prefix (CP) instead of a zero padding (ZP).

Figure 6:
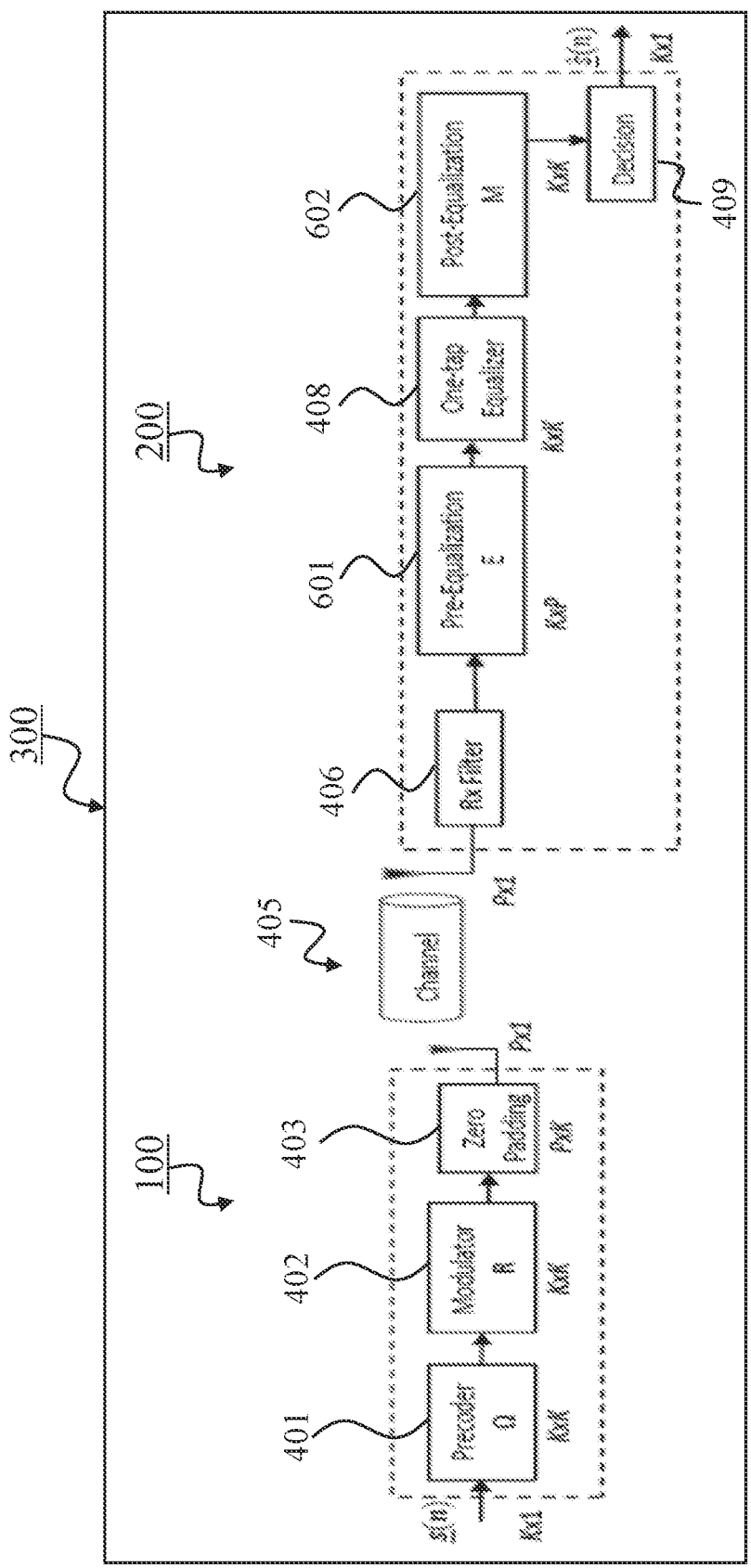
FIG. 6 an exemplarily scheme of the transceiver device for a single carrier modulation scheme comprising the transmitter device using a Lagrange matrix for modulation and the receiver device using two Vandermonde matrices for demodulation, according to an embodiment of the invention.

Reference is made to FIG. 6 which is an exemplarily scheme of the transceiver device 300 for a single carrier modulation scheme comprising the transmitter device 100 using a Lagrange matrix for modulation and the receiver device 200 using two Vandermonde matrices for demodulation, according to an embodiment of the invention.

In the block diagram of the SCLV modulator of FIG. 6, the single carrier transceiver device 300 comprises the transmitter device 100 which is compatible with the multicarrier LV modulator, while the receiver device 200 uses two Vandermonde matrices for pre and post equalization.

The transmitter device 100 which includes a precoder 401, a modulator 402 and a ZP block 403. Moreover, by assuming, that the transmitter device 100 (i.e., has been detailed above) transmits K symbols per frame, the communication channel and the receiver device 200 can be described.

The communication channel of the transceiver device 300 comprises the transmitter filter (Tx filter, not shown in FIG. 6) and the receiver filter (Rx filter) 406 (for example, they may be raised cosine filters). In addition, the parameter C 405 which is a propagation channel of order L may be obtained according to Eq. 13:

$$C(z) = \sum_{l=0}^{L} h_l z^{-l} \qquad \text{Eq. 13}$$

Furthermore, the convolution of the Tx filter, the C 405 and the Rx filter 406 may be given by a channel matrix H.

The transceiver device 300 further comprises the receiver device (Rx) 200 which includes the Pre-equalizer 601, the one-tap Equalizer unit 408, the Post-equalizer 602 and the decision block 409.

The Pre-equalizer 601 uses a matrix E which is a Vandermonde matrix having a size of K×P. Moreover, the one-tap equalizer 408 uses a K×K diagonal matrix. Moreover, the Post-equalizer 602 uses M, which is a K×K matrix (for example, it may be a Vandermonde matrix).

The pre-equalized received signal (applying E to the received signal) is given by Eq. 14:

$$y = \begin{bmatrix} C(\rho_0) & & \\ & \ddots & \\ & & C(\rho_{K-1}) \end{bmatrix} E(:, 1:K) s + E\eta \qquad \text{Eq. 14}$$

Moreover, applying the one-tap equalization 408, then the post-equalization 602 to the "y", Eq. 15 may be obtained as:

$$\hat{y} = s + \underbrace{\overbrace{E(:, 1:K)^{-1}}^{M} \overbrace{\begin{bmatrix} C(\rho_0)^{-1} & & \\ & \ddots & \\ & & C(\rho_{K-1})^{-1} \end{bmatrix}}^{D} E\eta}_{u} \qquad \text{Eq. 15}$$

where the matrix M should be the inverse of a Vandermonde matrix. For instance, the E(:,1:K) is the K first columns of the Vandermonde matrix E, the pre-euglization matrix which is used by the demodulator of the multicarrier LV scheme (e.g., as shown in FIG. 4), given by Eq. 16 as:

$$E(:, 1:K) = \begin{bmatrix} 1 & \rho_0^{-1} & \cdots & \rho_0^{1-K} \\ 1 & \rho_1^{-1} & \cdots & \rho_1^{1-K} \\ \vdots & \vdots & & \vdots \\ 1 & \rho_{K-1}^{-1} & \cdots & \rho_{K-1}^{1-K} \end{bmatrix} \qquad \text{Eq. 16}$$

which is a Vandermonde matrix.

Note that, the following operations or conditions may be performed or satisfied.

This result is true $\forall \rho_k \Rightarrow$ For example, the plurality of signature roots $\rho_k$ may further be determined (e.g., an operation to obtain or determine or choose the plurality of signature roots $\rho_k$).

It may further be determined, choosing the $\rho_k$ such that avoiding a Vandermonde matrix inversion in the post-equalization process.

If $C(\rho_k) \neq 0$, $\forall k \Rightarrow$ a perfect recovery condition may be satisfied with f expression.

It may be determined, e.g., how to choose (optimize) the signature roots in order to boost the system performance (such as minimize the bit error rate (BER)).

As discussed, the transceiver design of the invention comprises the transmitter device which may be compatible with both single carrier and multicarrier transmissions. In the following, the transmitter device and the receiver device (e.g., their circuitries) are presented and the implemented methods thereof, for providing the SCLV transceiver that satisfies the PR condition while keeping a low receiver implementation. Moreover, the aforementioned goal may be achieved, without any signaling exchange between the transmitter device and the receiver device.

As discussed above, in some embodiments, the transmitter device 100 does not need any feedback from the receiver device 200 since it is a single carrier transmission, the transmitter device 100 adds L zeros to the frame of K symbols and then transmits a frame of P=K+L over the channel (see FIG. 5).

However, the receiver device 200 needs to define K signature roots to build the pre- and post-equalizers as well as the one-tap equalization. As stated above, the post-equalization should carry out a Vandermonde matrix inversion (high complexity operation) if the signature roots have not been well selected. Furthermore, the complexity of an optimization over $\mathbb{C}^K$ to select the best K signature roots increases with K.

This problem may be solved based on operations performed in the following two steps including step 1 and step 2:

Step I: Choosing the Plurality of Signature Roots.

For example, the plurality of signature roots ($\rho_k$) may be uniformly distributed on the circumference of a circle, e.g., uniformly spread over a circle of radius a, such that $$\rho_k = a e^{\frac{j2\pi k}{K}}.$$

The post-equalization matrix reduces to a Vandermonde matrix, given by:

$$M = \frac{1}{K} \begin{bmatrix} 1 & 1 & \cdots & 1 \\ \rho_0 & \rho_1 & \cdots & \rho_{K-1} \\ \vdots & \vdots & & \vdots \\ \rho_0^{K-1} & \rho_1^{K-1} & \cdots & \rho_{K-1}^{K-1} \end{bmatrix} \quad \text{Eq. 17}$$

Figure 19:
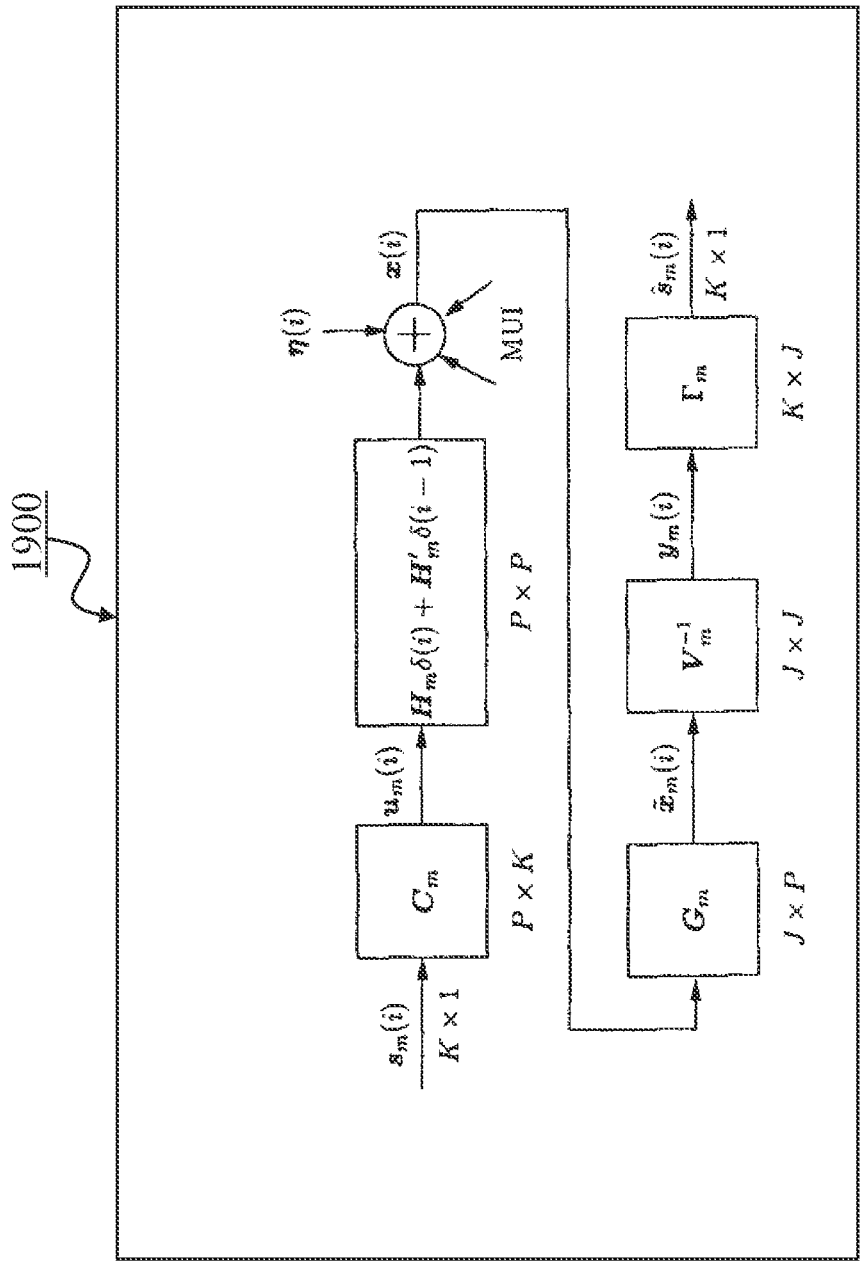
FIG. 19 schematically illustrates a conventional Mutually-Orthogonal Usercode-Receiver (AMOUR) block diagram.

It may provide a low-complex transceiver implementation comprising two Vandermonde matrices and a simple one-tap equalization, and no matrix inversion (as it is required in the AMOUR system 1900 in FIG. 19).

Moreover, if $a_{opt}=1$, therefore $E_{K \times P} = \tilde{F} = [F\ F(:,1:L)]$ and $M = F^H$.

Therefore, the SCLV scheme may reduce to the SC-FDM (A).

Moreover, a procedure for modifying the radius of the circle may be provided. For example, the transceiver device 300 (e.g., its receiver device 100) may modify (e.g., optimize) the radius of the circle. A method, among others, for optimizing the radius "a" is to minimize the mean squared error (MSE) given by:

$$MSE = \frac{\sigma_\eta^2}{K} \text{trace}\left(E^H \underbrace{D^H M^{-H} M\ D}_{Z} E\right) \quad \text{Eq. 18}$$

where Z is a K×K matrix, given by Eq. 19 as follow:

$$Z(k,n) = \frac{1-a^{2K}}{K^2 C(\rho_k)^* C(\rho_n)\left(1 - a^2 e^{\frac{j2\pi(n-k)}{K}}\right)} \quad \text{Eq. 19}$$

Moreover, the MSE is given by:

$$MSE = \sigma_\eta^2 \frac{1-a^2}{K^3} \sum_{k=0}^{K-1} \sum_{n=0}^{K-1} \frac{1 - a^{-2(K+L)} e^{\frac{j2\pi L(k-n)}{K}}}{C(\rho_k)^* C(\rho_n)\left(2 - a^2 e^{\frac{j2\pi(n-K)}{K}} - a^{-2} e^{\frac{j2\pi(k-n)}{K}}\right)} \quad \text{Eq. 20}$$

The modified (e.g., optimal) radius $a_{opt}$ may be determined as $a_{opt}$=argmin MSE.

Step 2: Modifying the Plurality of the Signature Roots.

For example, the signature roots that uniformly spread over a circle of radius $a_{opt}$ may be used, and an algorithm may further be applied that may optimize the signature roots individually following a specific optimization metric. In particular, a machine learning techniques may be used in this step.

In the following the step 2 is exemplarily referred to as the "signature roots refinement". A detailed description of this step is provided, for example, in FIG. 8 and FIG. 11a, FIG. 11b, FIG. 13a, and FIG. 13b.

Figure 7:
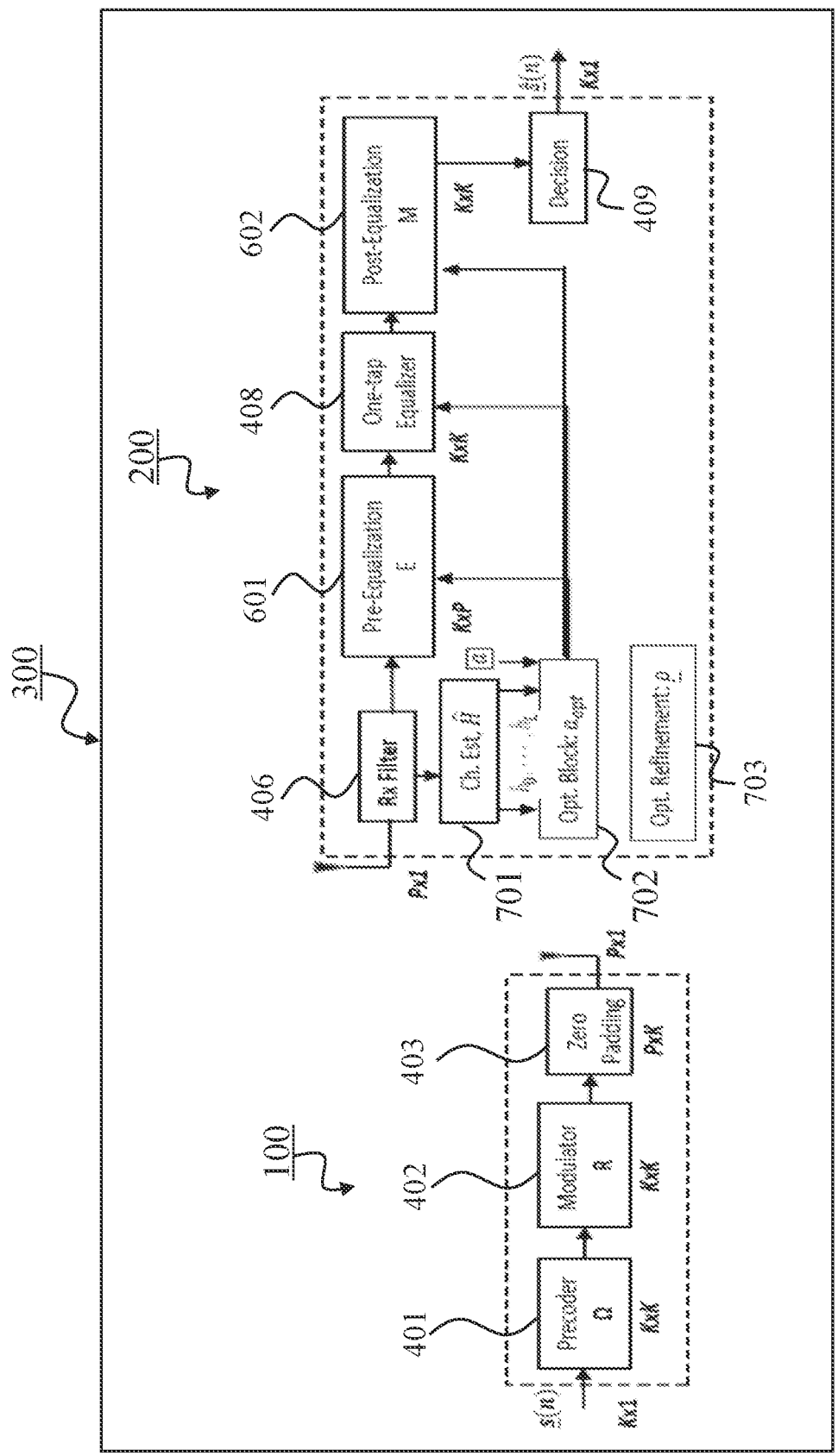
FIG. 7 is an exemplarily scheme of the transceiver device comprising the receiver device using a radius of a circle for building its modules.

Reference is made to FIG. 7 which is an exemplarily scheme of the transceiver device 300 comprising the receiver device 200 uses a radius of a circle for building its modules.

In the block diagram FIG. 7, the single carrier transceiver 300 may be compatible with the LV (and VL) modulators that satisfy the perfect recovery condition while keeping a low complex transceiver implementation.

Step I: Choosing the Plurality of Signature Roots.

For example, the plurality of signature roots ($\rho_k$) may be uniformly distributed on the circumference of the circle, e.g., uniformly spread over a circle of radius a, such that $$\rho_k = a e^{\frac{j2\pi k}{K}}.$$

1. For example, an optimization block 702 is provided that needs the channel state information (can be obtained from the channel estimation unit 701) in order to compute the optimization metric (e.g., the MSE detailed above), and it may further compute the $a_{opt}$.
2. The receiver device 200 uses the $a_{opt}$ to compute the pre-equalizer (in 601), the one-tap equalizer (in 408), and the post-equalizer (in 602) modules.

In some embodiments of the invention, the above mentioned step 1 (i.e., Step I: choosing the plurality of signature roots) may only be performed (i.e., the above step may be enough).

Moreover, in some embodiments, (e.g., depending on the use case), the above mentioned step 2 (i.e., Step 2: modifying the plurality of the signature roots) may further be performed, which is exemplarily discussed, e.g., this step is provided, for example, in FIG. 8 and FIG. 11a, FIG. 11b, FIG. 13a, and FIG. 13b.

Figure 8:
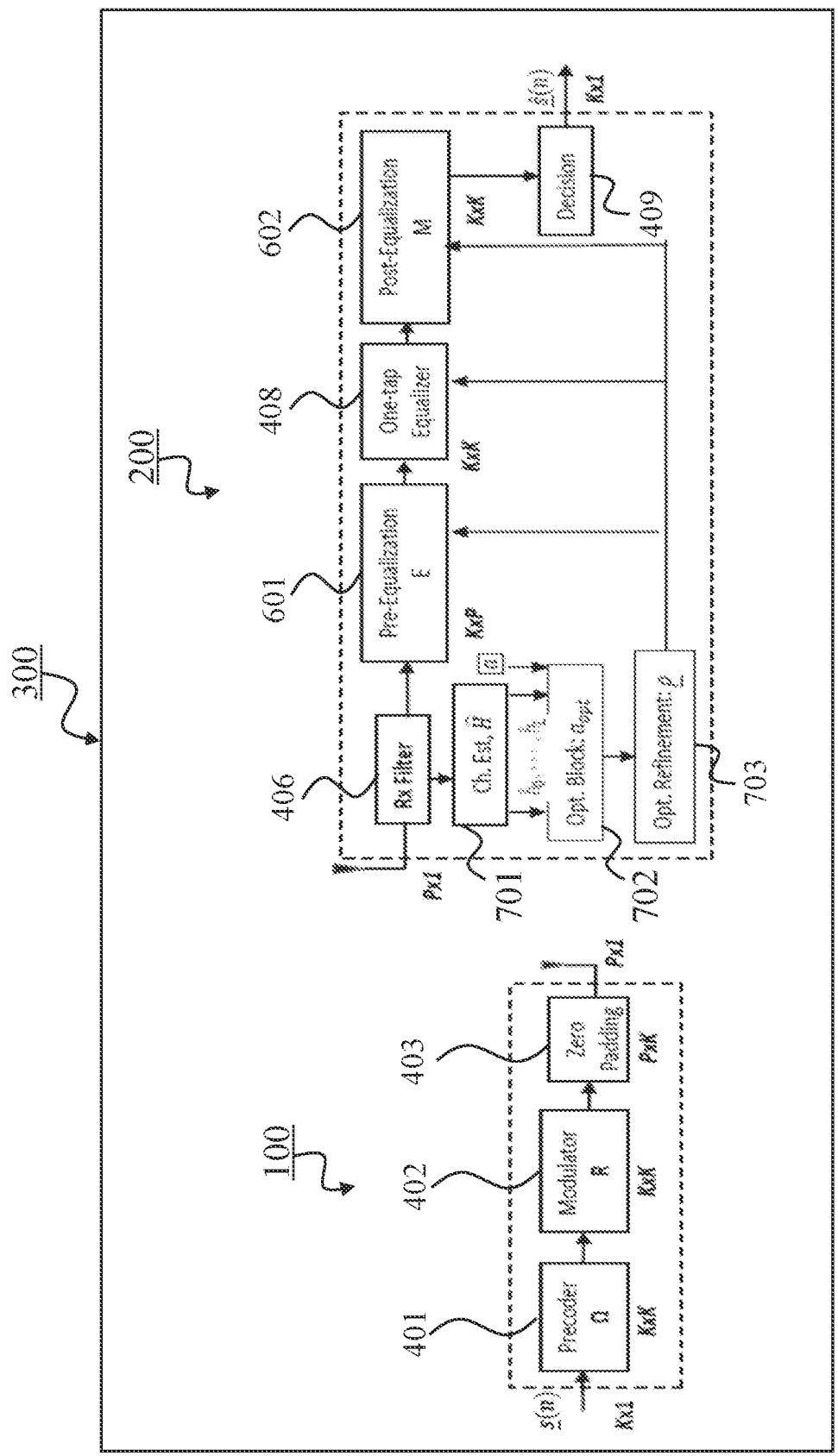
FIG. 8 is an exemplarily scheme of the transceiver device comprising the receiver device modifying the plurality of signature roots.

Reference is made to FIG. 8 which is an exemplarily scheme of the transceiver device 300 comprising the receiver device 200 modifying the plurality of signature roots. The step 2 may be performed as follow:

Step 2: Modifying the Plurality of the Signature Roots

For example, the signature roots that uniformly spread over a circle of radius $a_{opt}$ may be used, and an algorithm may further be applied that may optimize the signature roots individually following a specific optimization metric. In particular, a machine learning techniques may be used, and the following operations may be performed.

1. The optimization block 702 that needs the channel state information (which may be obtained using the channel estimation unit 701) in order to compute the optimization metric (for instance, the MSE detailed above) and it may further compute the $a_{opt}$.
2. Moreover, a refinement block 703 (for example, it may use a refinement algorithm) that needs to refine the signature roots individually following a specific optimization method and using a specific metric.
3. Furthermore, the receiver device 100 may use the modified plurality of signature roots ρ to compute the pre-equalizer (in 601), the one-tap equalizer (in 408), and the post-equalizer (in 602) modules.

Figure 9B:
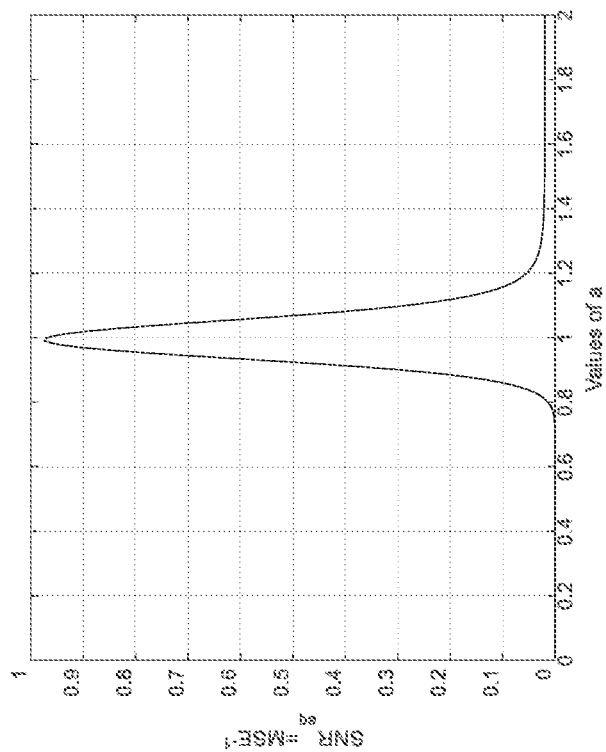
FIG. 9a and FIG. 9b illustrate two exemplarily channel realization.
Figure 9A:
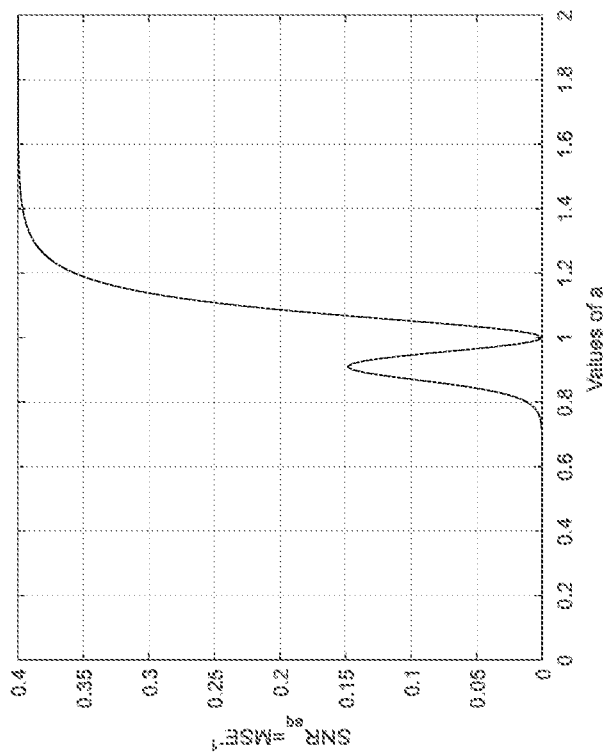

References are made from FIG. 9a and FIG. 9b which illustrate two exemplarily channel realization.

At the step 1, the signature roots may be determined such that they are uniformly spread over a circle of radius a, for example, according to $$\rho_k = ae^{\frac{j2\pi k}{K}}.$$

The significance of $a_{opt}$ and its impact on the overall system performance is exemplarily described.

For example, for a system of K=16, and the channel spread L=4, two channel realization including channel realization 1 and channel realization 2 may be determined as follow, where the C(z) is the channel response:

• Channel realization 1: $C(z) = 1 + z^{-4}$

• Channel realization 2: $C(z) = 1 - z + z^{-4}$

Furthermore, considering the optimization metric, the MSE, it may be determined that, in the example of channel realization 1 which is illustrated in FIG. 9a, the optimum radius is between 1.4 and 2. Note that, if we use ZP-OFDM (a=1) the signal cannot be efficiently recovered, since $$SNR_{eq} = \frac{1}{MSE}$$

is almost 0 (see FIG. 9a).

However, in the example of channel realization 2, which is illustrated in FIG. 9b, the best choice is when the radius is equal to 1, then the SCLV scheme reduces to the SC-FDM.

In the following, the application of Step 1 and the relevance of Step 2 is discussed.

Figure 10A:
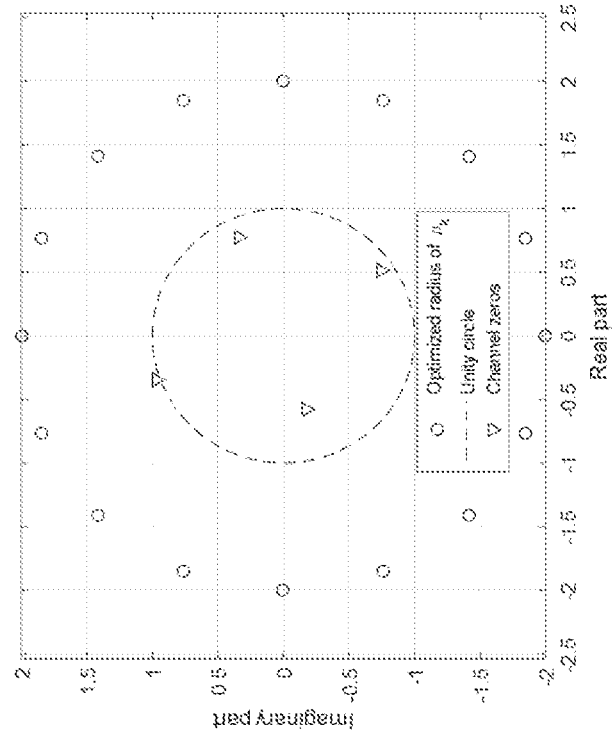
FIG. 10a and FIG. 10b illustrate an example of determining a radius of a circle (FIG. 10a) and further determining the signature roots using the radius of the circle (FIG. 10b).
Figure 10B:
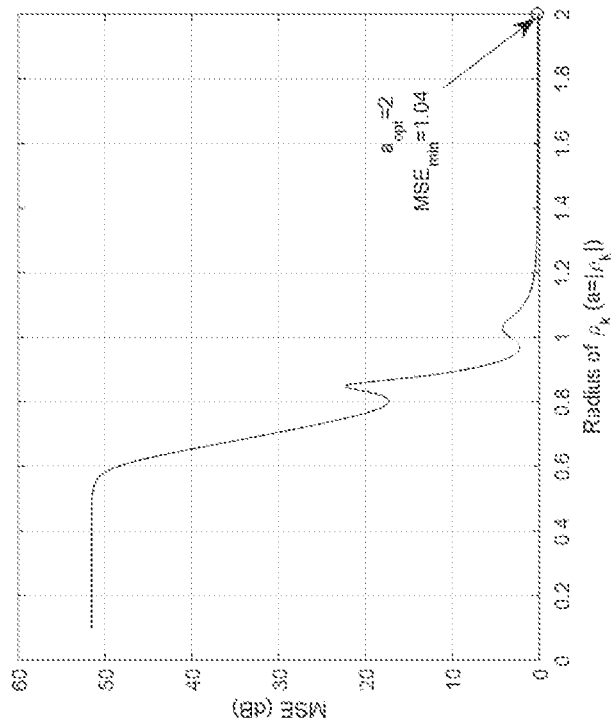

References are made from FIG. 10a and FIG. 10b which illustrate determining a radius of the circle (FIG. 10a) and further determining the signature roots using the radius of the circle (FIG. 10b).

For example, the Gradient descent algorithm may be used in order to perform the individual signature roots optimization (i.e., modifying the signature root). For instance, at first, the radius of the circle $a_{opt}$ may be used (i.e., which has been provided by Step 1) and considering the K=16 and the L=4 (e.g., the results given by Step 1). The determined radius of the circle in FIG. 10a may be used and the plurality of the signature roots may further be determined, as it is illustrated in FIG. 10b.

The results from Step 1 provide that the optimal radius should be equal to 2. However, the signature roots represented in FIG. 10b may further be modified (refined) using the Gradient Descent algorithm (GDA), where results are depicted in FIG. 11a and FIG. 11b, for the same channel realization.

Figure 11B:
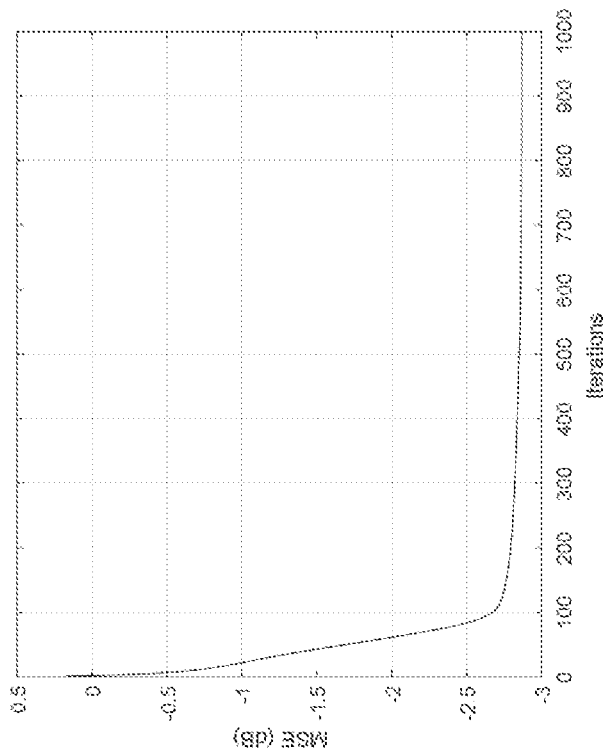
FIG. 11a and FIG. 11b illustrate modifying the plurality of signature roots, when the plurality of signature roots migrating toward new positions (FIG. 11a) and when the MSE decreases with the GDA iterations (FIG. 11b).
Figure 11A:
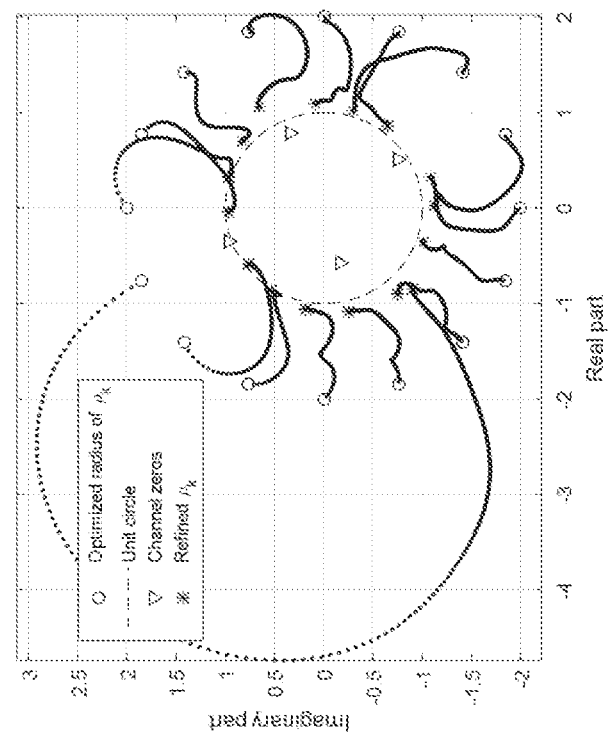

FIG. 11a and FIG. 11b illustrates the signature roots refinement using Step 2. FIG. 11a shows the plurality of signature roots migrating toward new positions, and FIG. 11b shows the MSE decreasing with the GDA iterations.

As it can be derived from FIG. 11b, that the MSE degrades while the GDA algorithm is optimizing the signature roots positions from an iteration to another.

Figure 12B:
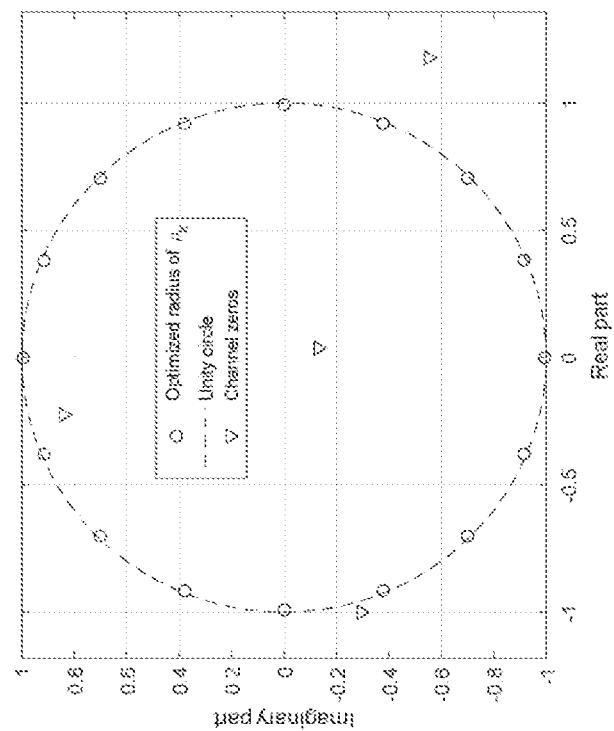
FIG. 12a and FIG. 12b illustrate another example of determining a radius of a circle (FIG. 12a) and further determining the signature roots using the radius of the circle (FIG. 12b).
Figure 12A:
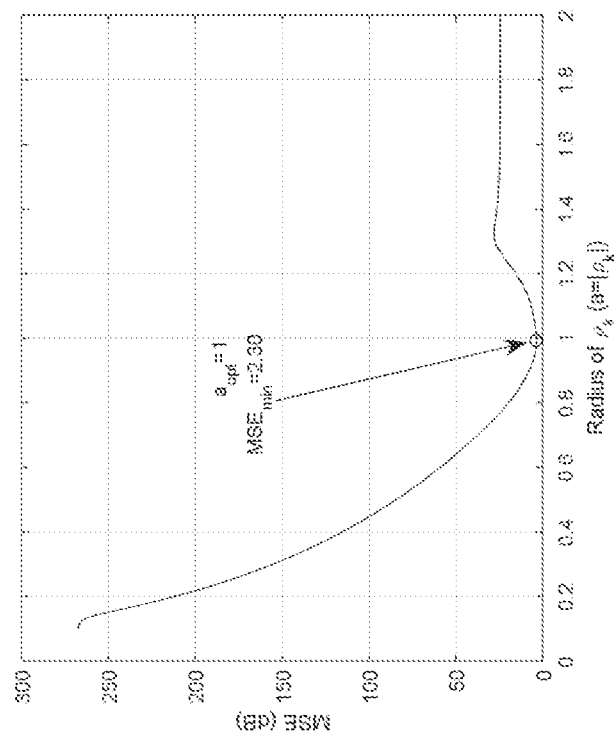

References are made from FIG. 12a and FIG. 12b which illustrate another example of determining a radius of the circle (FIG. 12a) and further determining the signature roots using the radius of the circle (FIG. 12b).

Another channel realization for K=16 and L=4, provides the results given by Step 1 in FIG. 12a and FIG. 12b.

For example, the Gradient descent algorithm may be used in order to perform the individual signature roots optimization (i.e., modifying the signature root). For instance, at first, the radius of the circle $a_{opt}$ may be used (i.e., which has been provided by Step 1) and considering the K=16 and the L=4 (e.g., the results given by Step 1). The determined radius of the circle in FIG. 12a may be used and the plurality of the signature roots may further be determined, as it is illustrated in FIG. 12b.

The results from Step 1 provide that the optimal radius should be equal to 1. Therefore, the provided scheme reduces to the SC-FDM(A) scheme. However, the signature roots represented in FIG. 12b may be modified (refined) using Gradient Descent algorithm (GDA), where results are depicted in FIG. 13a and FIG. 13b, for the same channel realization.

Figure 13A:
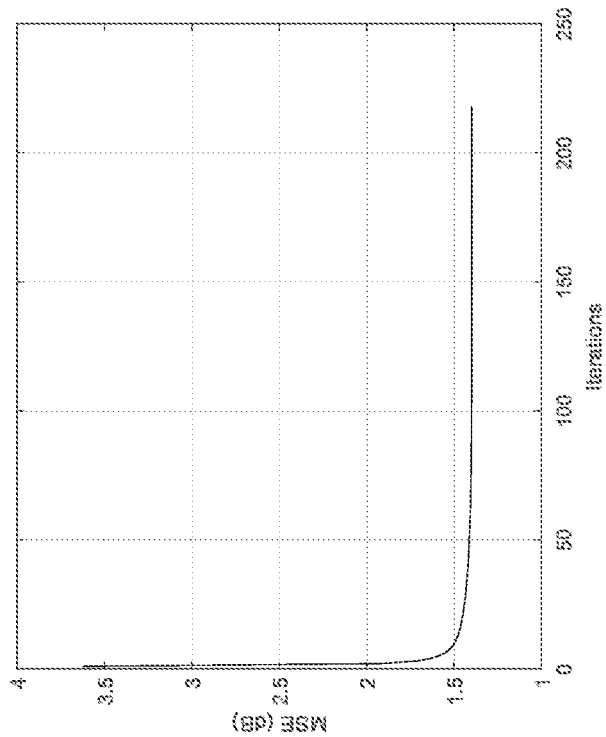
FIG. 13a and FIG. 13b illustrate another example of modifying the plurality of signature roots, when the plurality of signature roots migrating toward new positions (FIG. 13a) and when the MSE decreases with the GDA iterations (FIG. 13b).
Figure 13B:
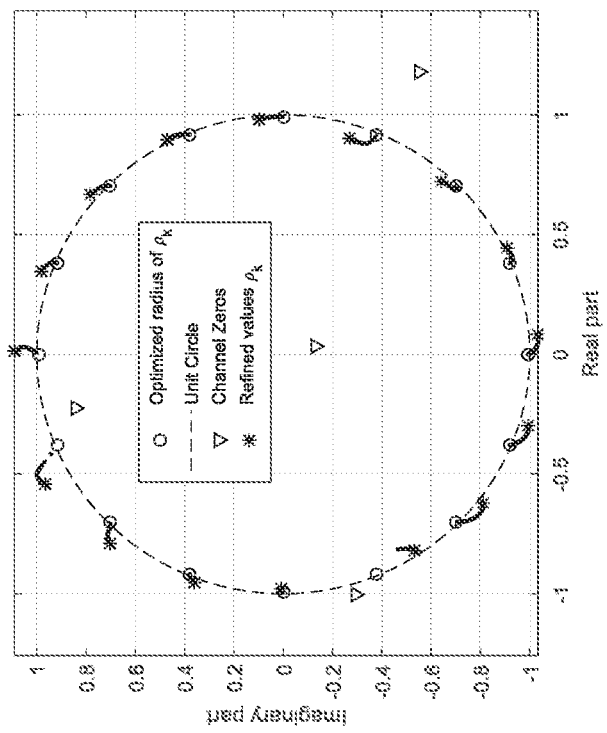

FIG. 13a and FIG. 13b illustrates the signature roots refinement using Step 2. FIG. 13a shows the plurality of signature roots migrating toward new positions, and FIG. 13b shows the MSE decreasing with the GDA iterations.

As it can be derived from FIG. 13b, that the MSE degrades while the GDA algorithm is optimizing the signature roots positions (leaving the unit circle) from an iteration to another.

Figure 14:
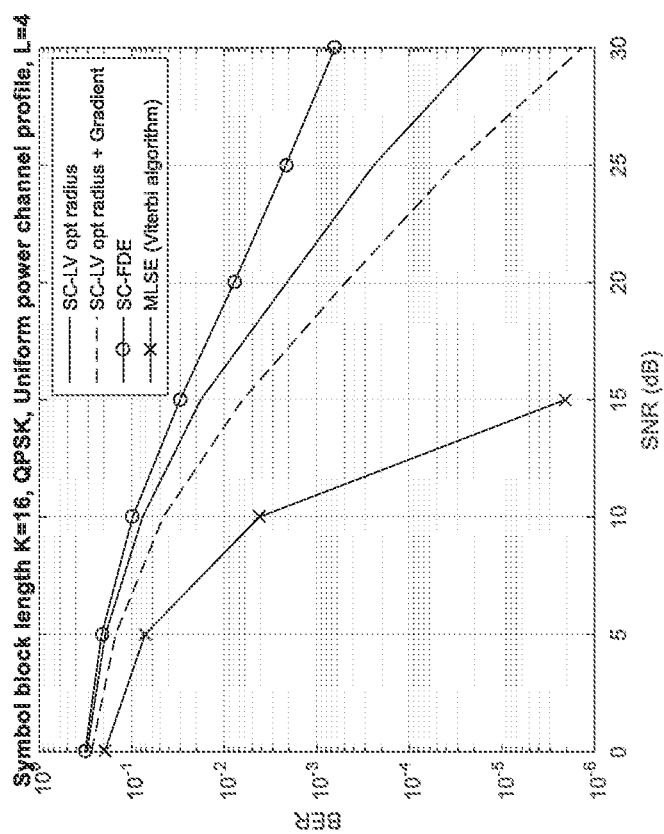
FIG. 14 shows the overall performance of the SCLV modulator of the invention compared to the conventional SC-FDM scheme.

FIG. 14 shows the overall performance of the SCLV modulator of the invention compared to the conventional SC-FDM scheme.

The comparison of the performance is performed based on considering K=16, L=4, and using frequency selective channel following a uniform pdp (the results can be derived for a more general channel). Moreover, the comparison of performance results is performed using Step 1 only, and step 1 along with the Step 2 (which uses Step 1 as an intermediate results).

Note that, the Step 2 brings a significant improvement compared to the SCLV and SC-FDM using Step 1 only. For example, A performance gain of 4 dB at $10^{-5}$ may be obtained (when SCLV uses Step 2 compared to Step 1 only).
The SCLV modulation scheme of the present invention outperforms the SC-FDM(A).

Figure 15:
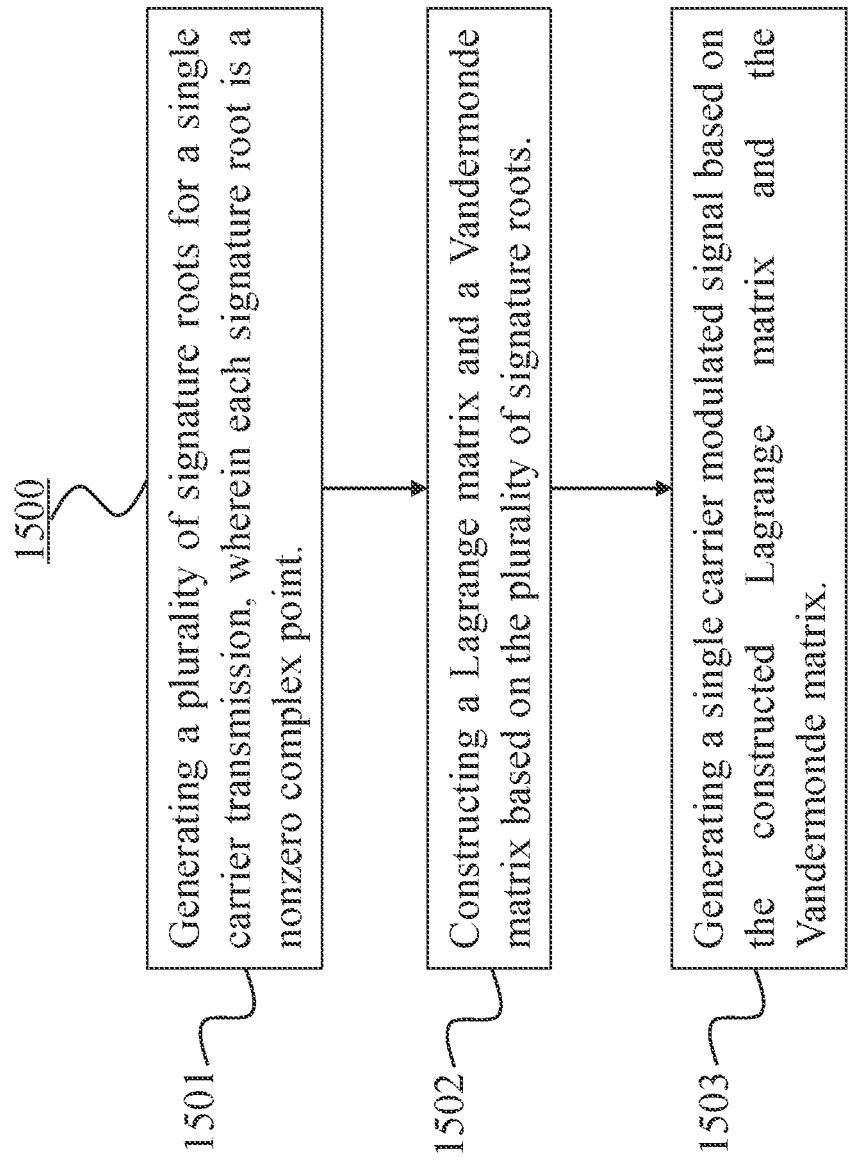
FIG. 15 is a flowchart of a method for being implemented at a transmitter device, according to an embodiment of the invention.

FIG. 15 shows a method 1500 according to an embodiment of the invention for being implemented at a transmitter device 100. The method 1500 may be carried out by the transmitter device 100, as it described above.

The method 1500 comprises a step 1501 of generating a plurality of signature roots $\rho_k$ for a single carrier transmission, wherein each signature root $\rho_k$ is a nonzero complex point.

The method 1500 further comprises a step 1502 of constructing a Lagrange matrix 101-L and a Vandermonde matrix 101-V based on the plurality of signature roots $\rho_k$.

The method 1500 further comprises a step 1503 of generating a single carrier modulated signal 102 based on the Lagrange matrix 101-L and the Vandermonde matrix 101-V.

Figure 16:
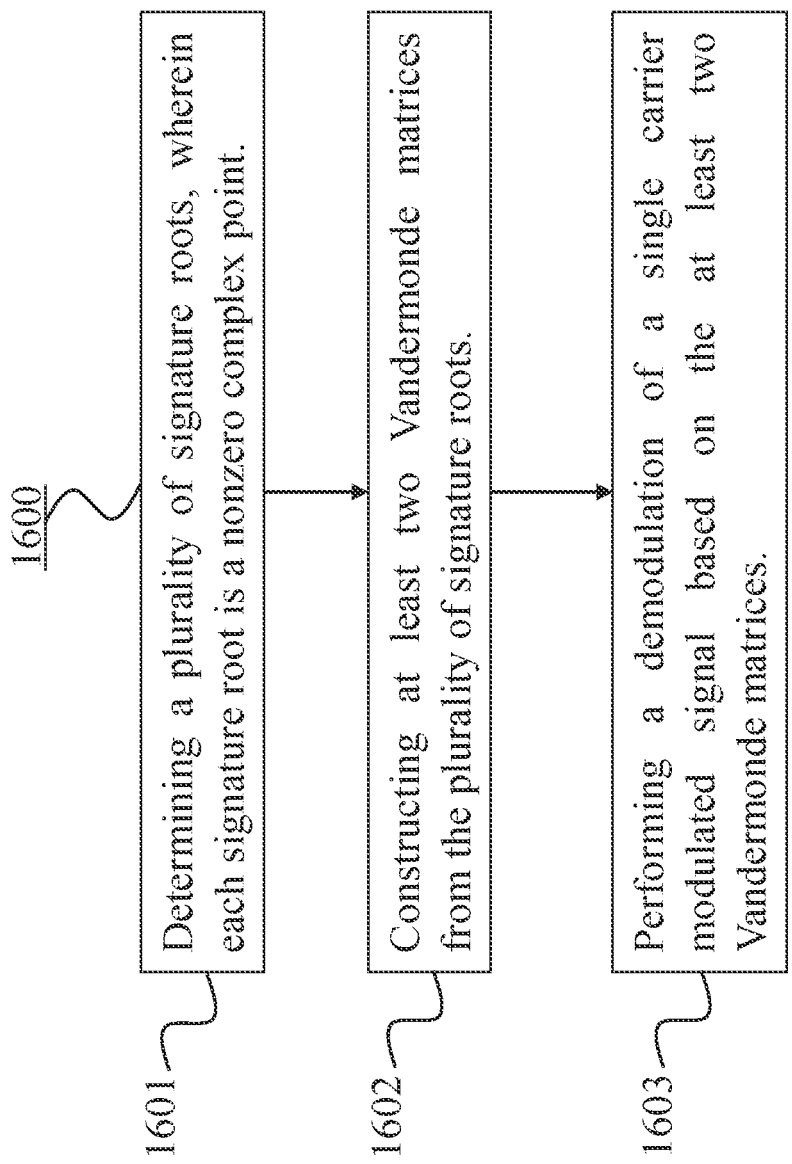
FIG. 16 is a flowchart of a method for being implemented at a receiver device, according to an embodiment of the invention.

FIG. 16 shows a method 1600 according to an embodiment of the invention for being implemented at a receiver device 200. The method 1600 may be carried out by the receiver device 200, as it described above.

The method 1600 comprises a step 1601 of determining a plurality of signature roots $\rho_k$, wherein each signature root is a nonzero complex point.

The method 1600 further comprises a step 1602 of constructing at least two Vandermonde matrices 201-V, 202-V from the plurality of signature roots $\rho_k$.

The method 1600 further comprises a step 1603 of performing a demodulation 203 of a single carrier modulated signal 102 based on the at least two Vandermonde matrices 201-V, 202-V.

Figure 17:
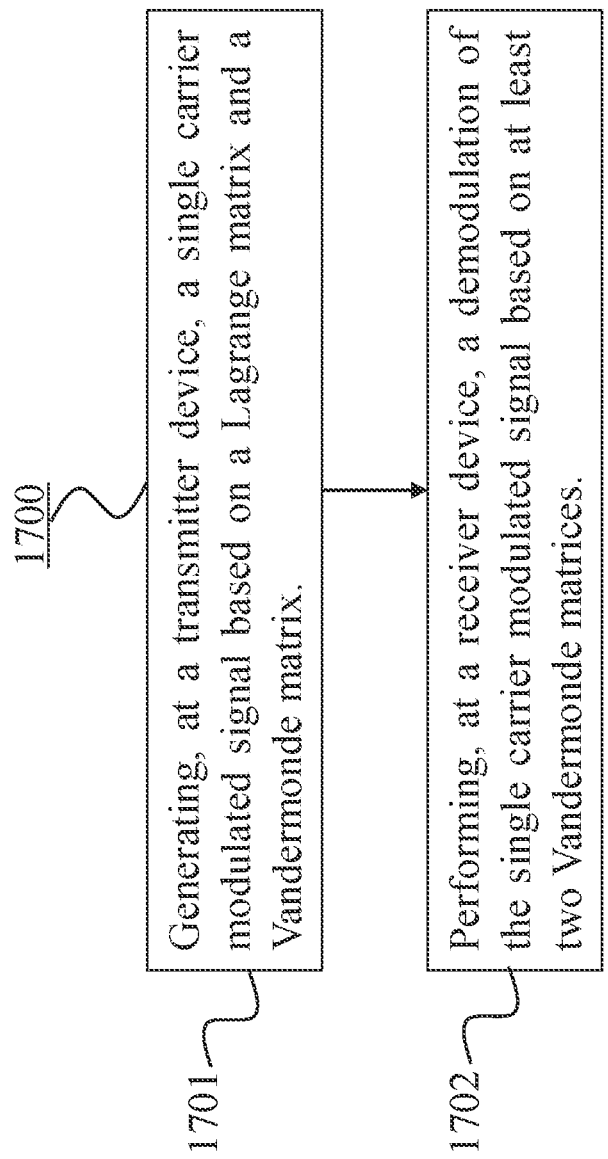
FIG. 17 is a flowchart of a method for being implemented at a transceiver device, according to an embodiment of the invention.
Figure 18:
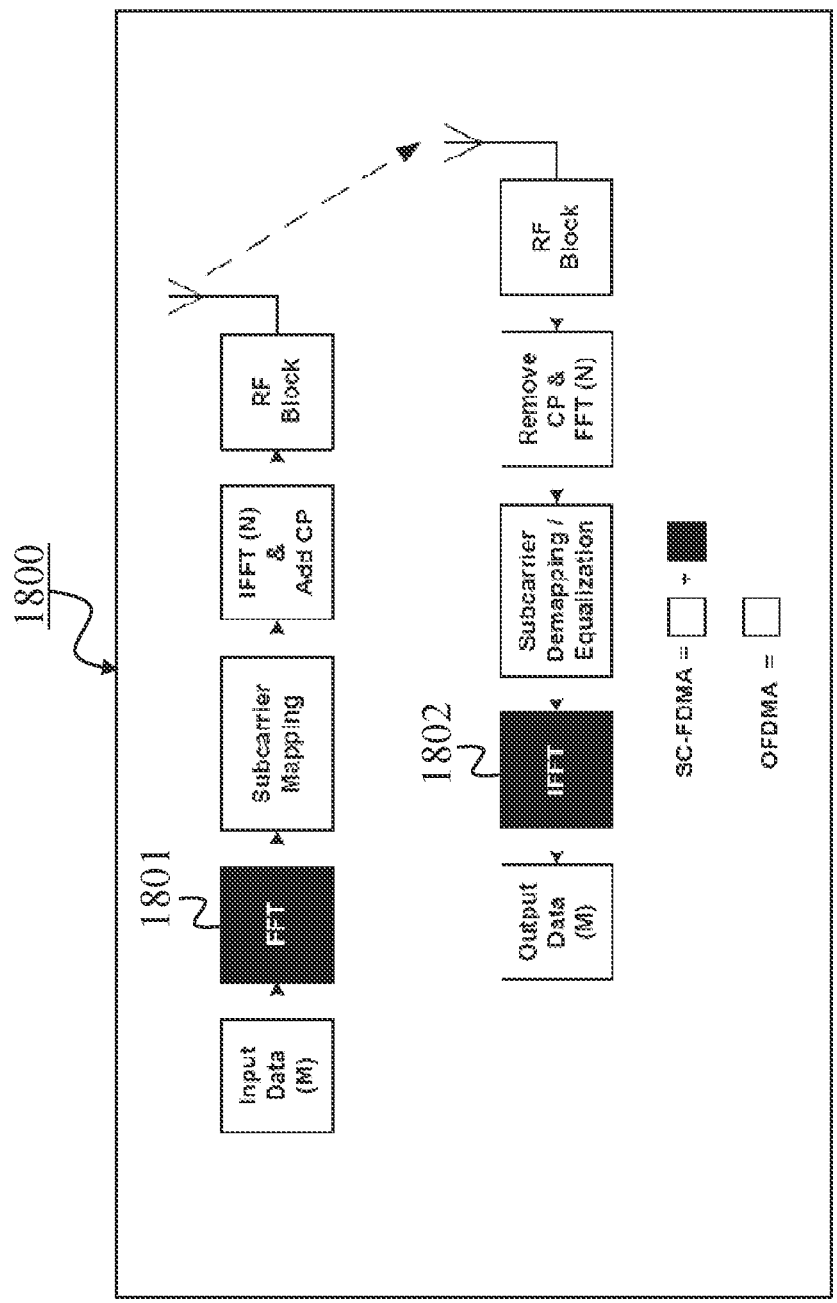
FIG. 18 schematically illustrates a single carrier frequency division multiplexing access block diagram.

FIG. 17 shows a method 1700 according to an embodiment of the invention for being implemented at a transceiver device 300. The method 1700 may be carried out by the transceiver device 300, as it described above.

The method 1700 comprises a step 1701 of generating, at a transmitter device 100, a single carrier modulated signal 102 based on a Lagrange matrix 101-L and a Vandermonde matrix 101-V.

The method 1700 further comprises a step 1702 of performing, at a receiver device 200, a demodulation 203 of the single carrier modulated signal 102 based on at least two Vandermonde matrices 201-V, 202-V.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitter device for a single carrier modulation scheme, the transmitter device comprising:
at least one processor; and
one or more memories coupled to the at least one processor and storing programming instructions for execution by the at least one processor to:
generate a plurality of signature roots ($\rho_k$) for a single carrier transmission, wherein each signature root ($\rho_k$) is a nonzero complex point;
construct a Lagrange matrix and a Vandermonde matrix based on the plurality of signature roots ($\rho_k$); and
generate a single carrier modulated signal based on the Lagrange matrix and the Vandermonde matrix.

2. The transmitter device according to claim 1, the programming instructions instructing the at least one processor to:
perform a zero-padding procedure or a cyclic-prefix procedure on the single carrier modulated signal.

3. A receiver device for a single carrier modulation scheme, the receiver device comprising:
at least one processor; and
one or more memories coupled to the at least one processor and storing programming instructions for execution by the at least one processor to:
determine a plurality of signature roots ($\rho_k$), wherein each signature root is a nonzero complex point;
construct at least two Vandermonde matrices from the plurality of signature roots ($\rho_k$); and
perform a demodulation of a single carrier modulated signal based on the at least two Vandermonde matrices.

4. The receiver device according to claim 3, wherein performing the demodulation comprises:
performing a pre-equalization procedure based on one of the Vandermonde matrices;
applying a one-tap equalizer on the output of the pre-equalization procedure; and
performing a post equalization procedure on the output of the one-tap equalizer based on the other Vandermonde matrix.

5. The receiver device according to claim 3, the programming instructions instructing the at least one processor to:
determine a radius (a) of a circle based on channel state information of a communication channel, wherein the determined plurality of signature roots ($\rho_k$) are uniformly distributed on the circumference of the circle.

6. The receiver device according to claim 5, the programming instructions instructing the at least one processor to:
compute a metric for evaluating the radius (a) of the circle or the plurality of signature roots ($\rho_k$), based on channel state information of a communication channel.

7. The receiver device according to claim 3, the programming instructions instructing the at least one processor to:
modify individually each signature root from the plurality of signature roots ($\rho_k$) based on a machine learning algorithm, in particular a gradient descent algorithm.

8. The receiver device according to claim 7, the programming instructions instructing the at least one processor to perform the demodulation of the single carrier modulated signal, considering the individual modification of each signature root.

9. A transceiver device comprising a transmitter device, the transmitter device comprising:
at least one processor; and
one or more memories coupled to the at least one processor and storing programming instructions for execution by the at least one processor to:
generate a plurality of signature roots ($\rho_k$) for a single carrier transmission, wherein each signature root ($\rho_k$) is a nonzero complex point;

construct a Lagrange matrix and a Vandermonde matrix based on the plurality of signature roots ($\rho_k$); and generate a single carrier modulated signal based on the Lagrange matrix and the Vandermonde matrix.

10. The transceiver device according to claim 9, the programming instructions instructing the at least one processor to perform a zero-padding procedure or a cyclic-prefix procedure on the single carrier modulated signal.

11. A transceiver device for a single carrier modulation scheme, the transceiver device comprising:

a transmitter device configured to generate a single carrier modulated signal based on constructing a Lagrange matrix and a Vandermonde matrix; and a receiver device configured to perform a demodulation of the single carrier modulated signal based on constructing at least two Vandermonde matrices.

12. The transceiver device according to claim 11, wherein the transmitter device is configured to perform a zero-padding procedure or a cyclic-prefix procedure on the single carrier modulated signal.

13. A method comprising:

generating, at a transmitter device, a plurality of signature roots ($\rho_k$) for a single carrier transmission, wherein each signature root ($\rho_k$) is a nonzero complex point;

constructing, at the transmitter device, a Lagrange matrix and a Vandermonde matrix based on the plurality of signature roots ($\rho_k$); and generating, at the transmitter device, a single carrier modulated signal based on the Lagrange matrix and the Vandermonde matrix.

14. A method, the method comprising:

determining, at a receiver device, a plurality of signature roots ($\rho_k$), wherein each signature root is a nonzero complex point;

constructing, at the receiver device, at least two Vandermonde matrices from the plurality of signature roots ($\rho_k$); and performing, at the receiver device, a demodulation of a single carrier modulated signal based on the at least two Vandermonde matrices.

15. The method according to claim 14, wherein performing the demodulation comprises:

performing a pre-equalization procedure based on one of the Vandermonde matrices;

applying a one-tap equalizer on the output of the pre-equalization procedure; and performing a post equalization procedure on the output of the one-tap equalizer based on the other Vandermonde matrix.

16. The method according to claim 14, further comprising:

determining a radius (a) of a circle based on channel state information of a communication channel, wherein the determined plurality of signature roots ($\rho_k$) are uniformly distributed on the circumference of the circle.

17. The method according to claim 16, further comprising:

computing a metric for evaluating the radius (a) of the circle or the plurality of signature roots ($\rho_k$), based on channel state information of a communication channel.

18. The method according to claim 14, further comprising:

modifying individually each signature root from the plurality of signature roots ($\rho_k$) based on a machine learning algorithm, in particular a gradient descent algorithm.

19. The method according to claim 18, further comprising:

performing the demodulation of the single carrier modulated signal considering the individual modification of each signature root.

20. A method comprising:

generating, at a transmitter device of a transceiver device, a single carrier modulated signal based on constructing a Lagrange matrix and a Vandermonde matrix; and performing, at a receiver device of the transceiver device, a demodulation of the single carrier modulated signal based on constructing at least two Vandermonde matrices.

* * * * *